(12) United States Patent
Berkheimer

(10) Patent No.: US 7,447,713 B1
(45) Date of Patent: Nov. 4, 2008

(54) SYSTEM AND METHOD FOR ARCHIVING AND OUTPUTTING DOCUMENTS OR GRAPHICAL ITEMS

(76) Inventor: Steven E. Berkheimer, 1280 Oak Trail Dr., Libertyville, IL (US) 60048

( * ) Notice: Subject to any disclaimer, the term of this patent is extended or adjusted under 35 U.S.C. 154(b) by 512 days.

(21) Appl. No.: 09/977,502

(22) Filed: Oct. 15, 2001

Related U.S. Application Data

(60) Provisional application No. 60/240,179, filed on Oct. 13, 2000.

(51) Int. Cl.
G06F 17/30 (2006.01)
G06F 9/44 (2006.01)
G06F 3/048 (2006.01)
G06G 5/02 (2006.01)

(52) U.S. Cl. .................. 707/204; 707/202; 717/121; 345/600; 715/763

(58) Field of Classification Search ......... 707/100–103, 707/104.1, 204, 202; 715/513, 528, 763; 358/1.1, 1.16, 1.18; 713/1; 717/121; 345/600
See application file for complete search history.

(56) References Cited

U.S. PATENT DOCUMENTS

| | | | | |
|---|---|---|---|---|
| 5,551,055 A * | 8/1996 | Matheny et al. | ............... | 710/62 |
| 5,671,353 A * | 9/1997 | Tian et al. | ............... | 714/48 |
| 5,889,932 A * | 3/1999 | Adegeest et al. | ............. | 358/1.18 |
| 6,195,092 B1 * | 2/2001 | Dhond et al. | ............... | 715/763 |
| 6,230,173 B1 * | 5/2001 | Ferrel et al. | ................. | 715/513 |
| RE37,722 E * | 5/2002 | Burnard et al. | ................. | 713/1 |
| 6,385,768 B1 * | 5/2002 | Ziebell | ....................... | 717/121 |
| 6,456,395 B1 * | 9/2002 | Ringness | ................... | 358/1.9 |
| 6,519,597 B1 * | 2/2003 | Cheng et al. | .................. | 707/10 |
| 6,549,935 B1 * | 4/2003 | Lapstun et al. | .............. | 709/204 |
| 6,581,076 B1 * | 6/2003 | Ching et al. | ................ | 707/204 |
| 6,697,078 B2 * | 2/2004 | Becker et al. | ............... | 345/589 |
| 6,721,769 B1 * | 4/2004 | Rappaport et al. | .......... | 707/205 |
| 6,738,152 B1 * | 5/2004 | Roth et al. | ................. | 358/1.14 |
| 6,745,161 B1 * | 6/2004 | Arnold et al. | .................. | 704/7 |
| 6,795,214 B2 * | 9/2004 | Weinholz et al. | ............. | 358/1.9 |
| 2002/0154325 A1 * | 10/2002 | Holub | ........................ | 358/1.9 |

OTHER PUBLICATIONS

Essam A. El-Kwae et al., "A Robust Framework for Content-Based Retrieval by Spatial Similarity in Image Databases", ACM, Apr. 1999, pp. 174-198.*

Achim Kraiss et al., "Integrated Document Caching and Prefectching in Storage Hierarchies based on Markov-chain Predictions", ACM, Jan. 1998, pp. 141-162.*

* cited by examiner

*Primary Examiner*—Thuy N Pardo
(74) *Attorney, Agent, or Firm*—Wood, Phillips, Katz, Clark & Mortimer

(57) ABSTRACT

Systems and methods for translating document files to a common input format can then parse the elements of such documents into an object oriented document model with linking tags associated with each of the objects, element properties and element property values. The system and method also provide a capability to efficiently compare, reconcile, store, distribute and edit such object oriented components, elements, properties and/or values. Archived documents or graphical items can be recompiled and output in a predetermined, standard format.

28 Claims, 9 Drawing Sheets

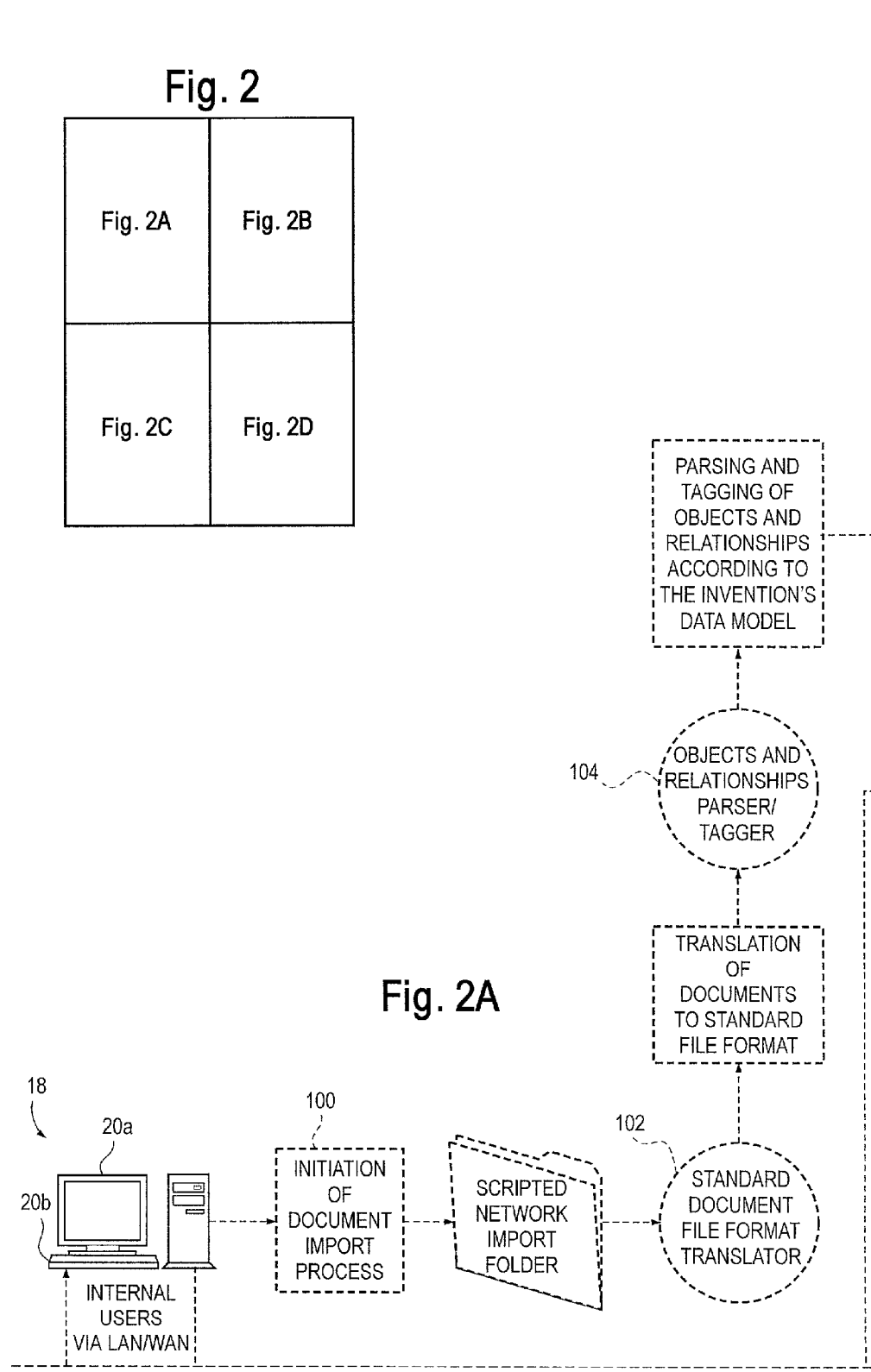

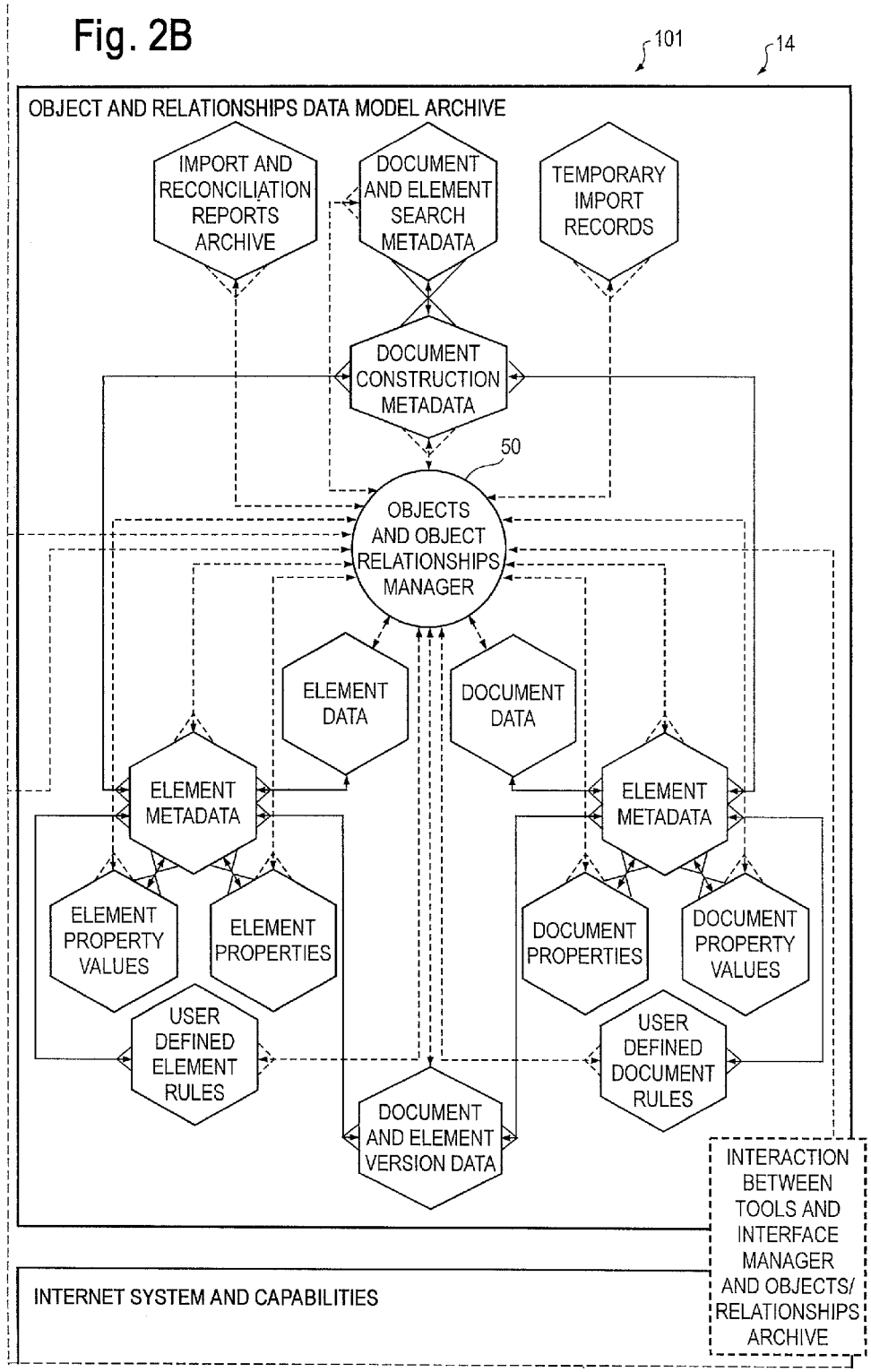

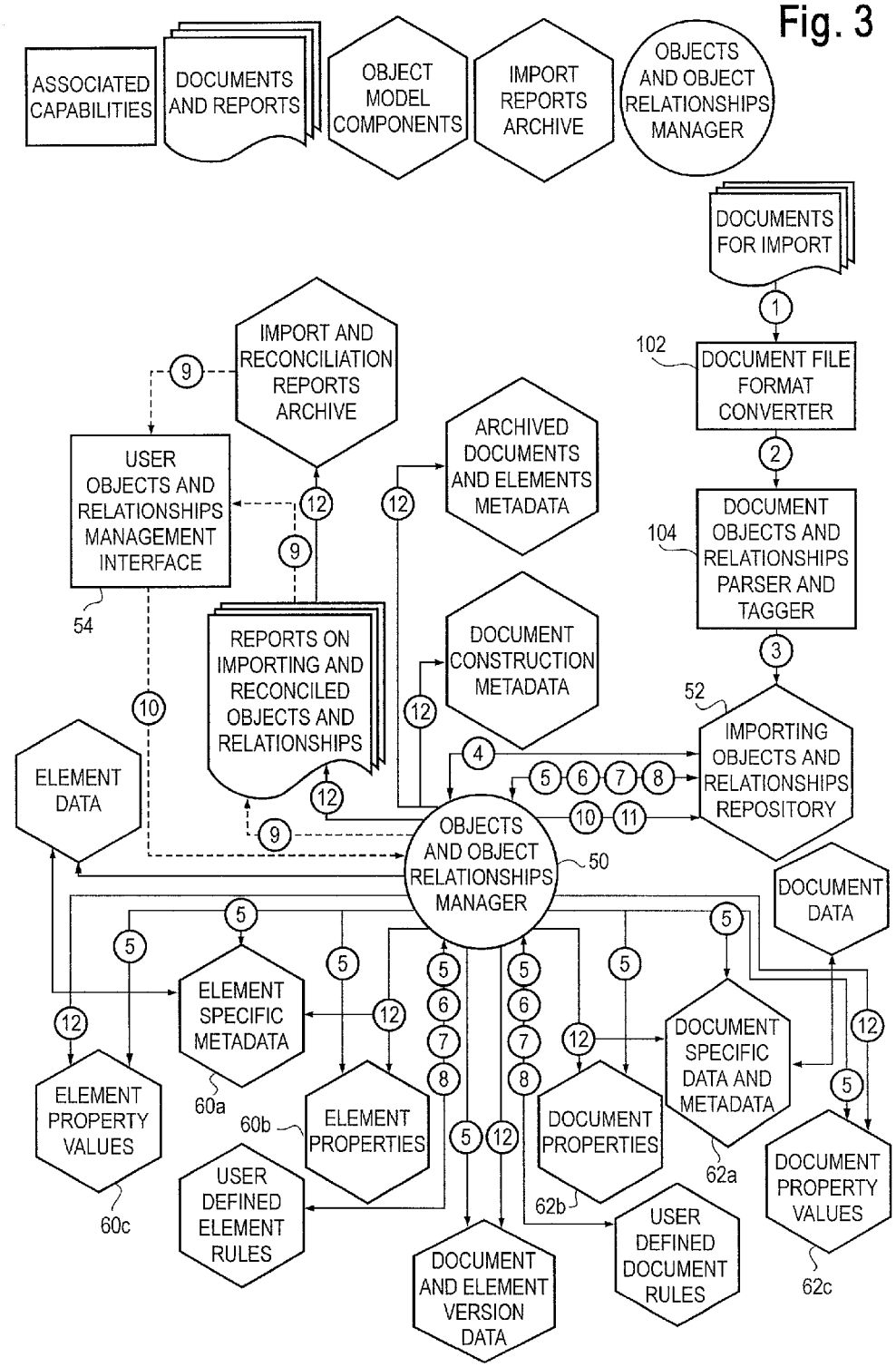

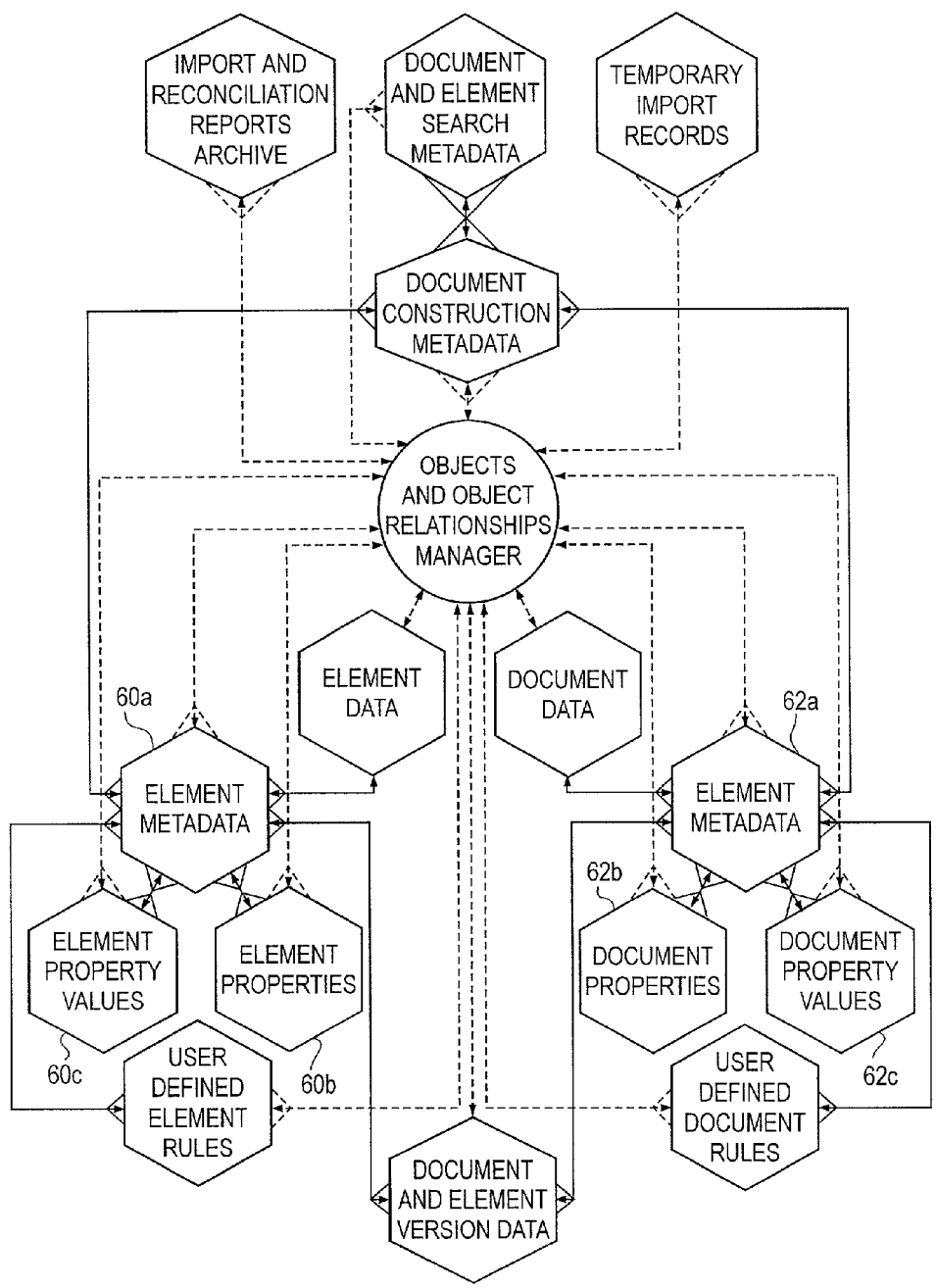

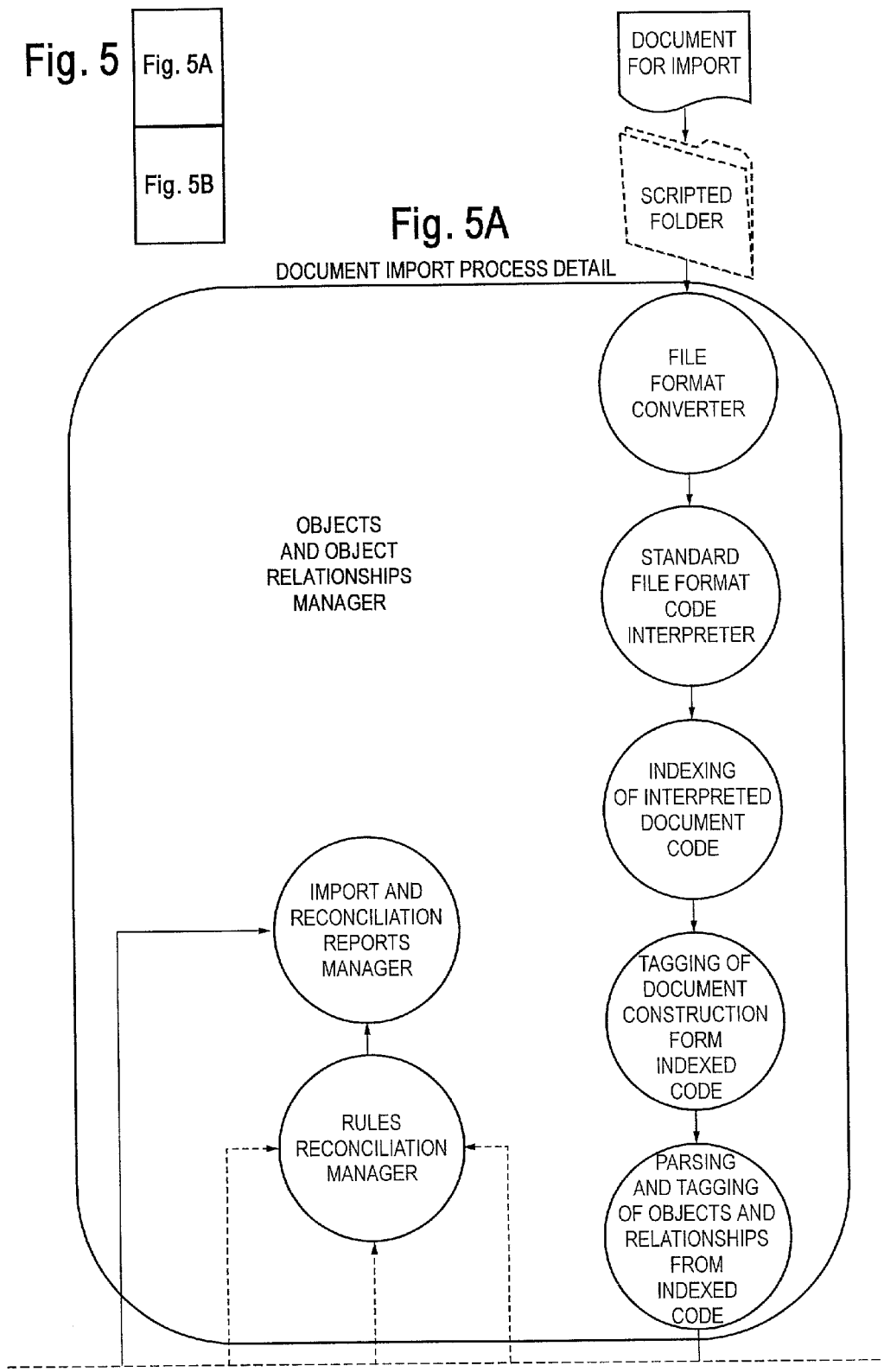

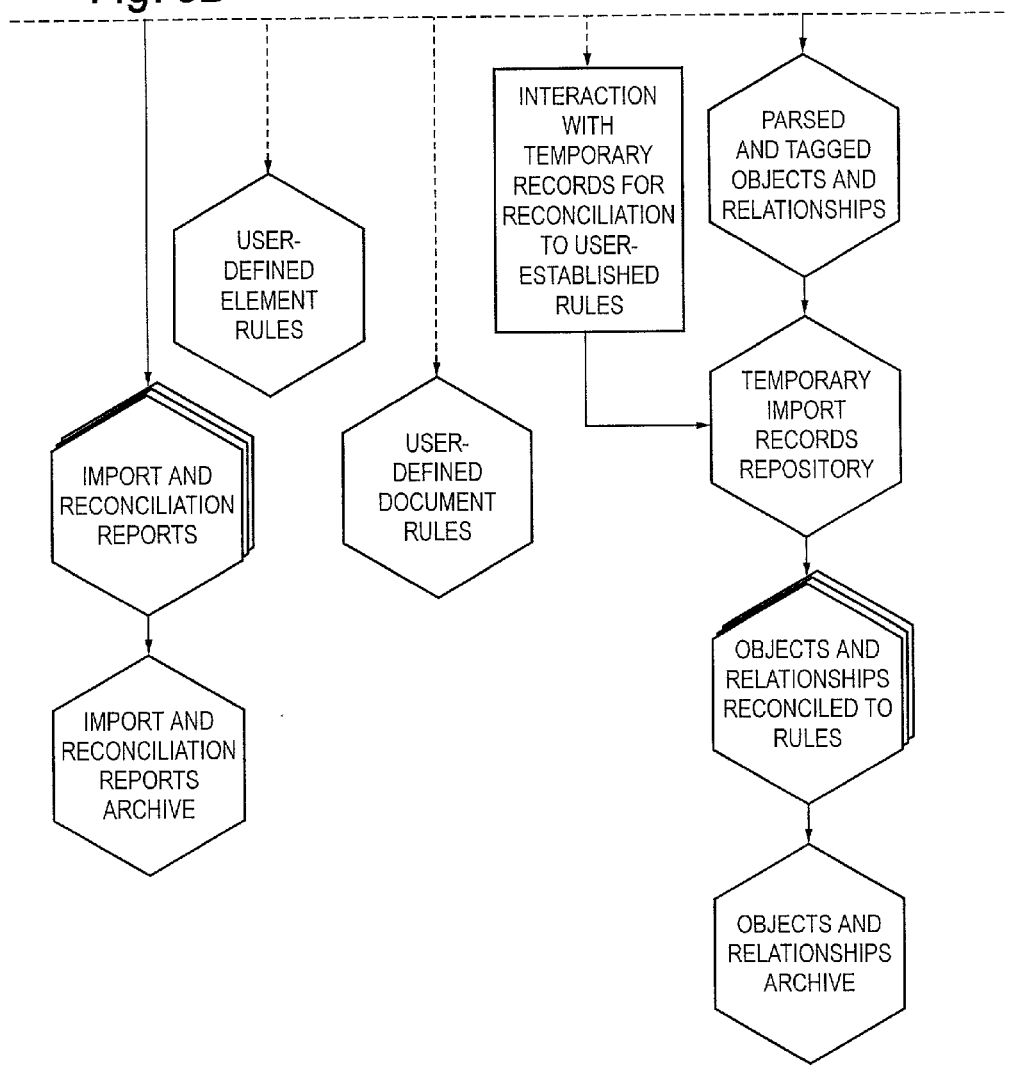

SYSTEM AND METHOD FOR ARCHIVING AND OUTPUTTING DOCUMENTS OR GRAPHICAL ITEMS

This application is a utility application claiming the benefit of the earlier filing date of provisional application Ser. No. 60/240,179 filed Oct. 13, 2000.

FIELD OF THE INVENTION

The invention pertains to digital asset management systems including the processing and archiving of files. More particularly, the invention pertains to processing to form object-oriented representations of files received in a standardized format. The object oriented representations can be graphically manipulated and then entered into an archival data base with minimal redundancy and with relationships maintained among the elements of the item for subsequent retrieval, editing, recompiling and outputting the file.

BACKGROUND OF THE INVENTION

To the largest extent the prevailing paradigm for electronic document creation, editing and archiving is rooted in perspectives established long ago for hard-copy documents. In today's digital asset management systems, numerous documents containing multiple instances of redundant document elements are the convention. Although these redundant elements may involve relatively minor property variations dealing with such associated characteristics as size and position in the document, the instances of basic element redundancy contributes to gross inefficiencies in the storage and use of documents in a digital archive.

Among the inefficiencies created by this paradigm and the digital document archiving capabilities driven by it is the unnecessarily large memory capacity requirements and subsequent costs for the devices and systems involved with document archiving. Another inefficiency of this paradigm involves the gross redundancy and menial work-effort, along with the associated unnecessary execution time and cost involved with editing or replacing multiple instances of common graphic elements present in large numbers of documents within an archive.

Associated with the hard-copy based paradigm that unnecessarily encumbers the efficient document use and archiving mentioned above is a similarly constraining and longstanding paradigm, which addresses the work processes and methods involved with converting documents for mass reproduction of as a work-in-turn, custom-manufacturing process. In this paradigm, over time the same reproduction-related preparation tasks are executed over and over again to the same basic elements, which are part of multiple documents prepared for reproduction. Because of the document archiving systems that are driven by this paradigm, those involved with the preparation of documents for mass production reproduction are unable to take advantage of the opportunities of a components-based manufacturing approach that are made possible by the methods, devices and processes of the invention.

One instance of the above noted problem arises where documents or graphical items from different sources are to be integrated into a single archive, and, have common elements added to various of the documents or graphical items, which have heretofore not existed. One example grows out of acquisition or merger activities wherein multiple companies combine and wish to revise existing documents, which have different corporate identities, to exhibit the new common corporate identity going forward. Such documents would include, without limitation, advertisements, manuals, brochures, letterheads, and other documents or graphical items which would be used in the normal course of corporate business activities.

With respect to combining groups of documents or graphical items from disparate sources into a single common archive going forward, it would be desirable to be able to efficiently and cost effectively manipulate certain kinds of symbols and wording. For example, inserting the new corporate logo and/or corporate name in the existing archiving data base, originated from two different companies, so that new copies of the documents or graphical items reflect the updated corporate logo and name. This capability would be particularly useful for product related documentation to be distributed by the new entity.

The execution of pre-print production work in connection with graphics documents is another instance where known systems and approaches incorporate less than optimal solutions in connection with maintaining data bases for a variety of product packaging graphical items and the like. In this instance, the tasks necessary to prepare art work for mass production printing are usually repeated over and over for each document that is to be printed. However, multiple documents in company graphics archives often have numerous graphic elements in common. The one-two-one relationship between graphic documents and the graphic elements contained in these documents is often the same between documents. Storage of redundant common graphics elements leads to inefficiencies and increased costs. Known asset management systems used in the graphics arts industry do not address this inefficiency in the storage of graphic documents or elements.

There thus continues to be a need for asset and content management systems for managing large archival data bases of linked documents or graphical items with minimal redundancy. Preferably, such data bases could be configured to incorporate a variety of new documents and/or graphical items in a way which is consistent with standards associated with pre-existing documents or graphical items and which can link common elements of later-entered documents or graphical items to pre-existing common elements. It would also be desirable if either on an item-by-item basis or an exception basis a user could graphically review a representation of newly entered items for purposes of control and consistency. Finally it would promote efficiency to be able to manage content on a one-to-many basis within the asset management environment.

SUMMARY OF THE INVENTION

An asset and content management system in accordance with the invention translates multiple documents and document components to and from an object-oriented archive having managed singular and unique document-related objects and relationships. These objects and relationships can be modified and utilized in various combinations, via multiple methods so as to achieve object integrity as well as one-to-many modification and concurrent updating of the archive.

A document or graphic content manipulation system and asset management system eliminate redundant instances of common text or graphical elements. Document or graphic file formats are converted to a standardized representation for subsequent processing. The standardized representations are then parsed into object oriented document components. The components are tagged for subsequent identification and linking purposes.

The parsed graphical objects and associated relationships are analyzed and compared to objects and relationships derived from other documents or items in a common multiple document or item, batch, mode import process. Additionally, objects and relationships are analyzed and compared to previously imported documents which are part of the archive.

Objects and relationships which are being imported are then analyzed and compared in accordance with user established rules and standards pertaining to object and object relationship clarification and differentiation. Objects and relationships being imported are analyzed and compared according to user established rules and standards pertaining to integrity and accuracy. Objects and relationships being imported are also analyzed and compared according to user established rules pertaining to redundant objects and object relationships.

Objects and relationships being imported can then be presented in reports in accordance with user established rules for importing objects and relationships. Objects can be manually displayed along with element properties and element property values or, document properties and document property values for manual correction, editing and reconciliation. Alternately, an automated reconciliation process can be executed for correcting and editing objects and relationships being imported. Finally, the reconciled objects and relationships can be moved from the importing repository to the archive for subsequent retrieval and use.

When the objects and relationships are entered into the archive, the relationships between various components are maintained. As a result, operators are able to view and manipulate document components and the content thereof either as part of a composite document or as separate document elements. Subsequently, the objects and items in the archives can be edited on a singular basis while effecting multiple linked documents or graphical items which are concurrently in the archive.

The process provides for automatic application of work effort on a single instance of a graphical object which will have a common effect across multiple documents or multiple graphical items throughout the archive. Additionally, textual objects can be edited on a singular basis, and through the pre-established links in the archive, can effect a plurality of related composite output documents which are being produced, for example, packaging variations for multiple products having common ingredients or disclosure information.

The archived document, documents, or items can be recompiled by a reverse parsing process. The recompiled document(s) or item(s) can be output in any one of a plurality of industry accepted file formats for copying, printing or electronic distribution.

In an environment where the documents or graphical items represent packaging, the present invention and archive system can be used to identify cylinders and plates from previously produced packaging SKUs. The existing cylinders and plates can be used to reduce turn around time and costs in printing new packaging.

Similarly, the archive manager system can automatically identify color separation document components from previously produced packaging SKUs. These can also be used to reduce turn around time and costs in color separating new packaging.

The processing system can automatically reconcile newly executed designs with pre-established design standards and reproduction specifications. This in turn can eliminate time consuming and costly rework and print reruns.

Where the management and archive system are provided as a remotely accessible capability, as in a processing and editing service, customers or participants can concurrently work on different components of single or multiple documents while still retaining the desired minimization of redundancy. Further, recompiled documents can be output in an internet standard format where desired.

The system's Interpreter/Parser has two primary functions. The first of these is to analyze documents or files, which may come from a variety of different sources and which have been converted to a pre-selected file format such as a POSTSCRIPT-type such as PostScript Level 1, PostScript Level 2, PostScript Level 3, PDF, GHOSTSCRIPT, a registered trademark of Aladdin Enterprises or similar formats.

The Parser determines and extracts components of the standardized document or item representation according to the data construct needs of the present Graphic Object Oriented Document model. Once an archive of Graphic Object Oriented Documents has been established, users are able to achieve a number of work execution efficiencies that are not possible with conventional object oriented and non-object oriented graphics data constructs and Associated Digital Asset Management Systems.

The second function of the system's Interpreter/Parser is to reassemble the Graphic Object Oriented Document modeled document into composite output files in one of a plurality of industry accepted output file formats, such as POSTSCRIPT-type file formats. Manipulated modeled documents can thus be used within conventional graphics software applications, which work with only one file at time as well as to allow for the output of modeled documents to digital printers, image setters, plate makers and engravers.

Some of the document components provided for in the model are intended for use with the present invention's tools and user interface. Some of these components are not present in imported documents. In some cases, component data is assigned in the Interpreter/Parser to allow for the management of document components in the invention archive. Some examples of document components not necessarily available in imported documents and assigned by the Interpreter/Parser include:

unique numerical document identity
  unique numerical document version identity
  pointer reference to all of each document's version and component fields
  version start and end date/time
  identity of the user executing a version
  pointer references to the document component fields effected by version executions
  the workflow step associated with the document version
  unique numerical element identity
  pointer reference to Element Version Metadata
  pointer reference to documents in the archive in which the element appears
  pointer reference to associated element properties
  pointer reference to associated element values indication of the element's status as a design standard element
  unique numerical element version identity
  pointer reference to associated Element Metadata
  workflow step associated with the element version
  element category
  element size pointer reference
  element shape construction type
  pointer reference to applicable element property values The invention includes methods, devices and processes, which:

1. Convert documents to be imported to the invention's base document file format as the first step of the invention's import process;
2. Parse the base document file format of documents being imported in accordance with the invention's document object model;
3. Enable users to establish circumstances, characteristics and criteria associated with objects being imported and/or object relationships so as to determine the nature of the invention's analysis and comparison of importing documents;
4. Enable users to establish information, derived from the invention's analysis and comparison of documents being imported that will be reported, distributed and archived in the invention's document object model archive;

5. Enable users to establish the circumstances, intervals and distribution lists that are to be applied to reports derived from the invention's analysis and comparison of documents being imported;

6. Enable users to establish rules and standards to used as the basis of differentiating, clarifying, correcting and eliminating redundancies associated with objects and object relationships derived from imported documents prior to their being archived in the invention's document object model archive;

7. Enable users to establish circumstances, characteristics and criteria, derived from the invention's analysis and comparison of imported documents and relating to user-established rules and standards, whereupon object and object relationship differentiation, clarification, correction and redundancy elimination will be effected by manual or automated means;

8. Enable users to access, view, edit, manipulate, replace, print, compile and download objects and object relationships contained in the invention's document object model archive;

9. Enable users to establish security-related privileges and rules effecting the invention's allowing or disallowing individual users or groups of users to access, view, edit, manipulate, replace, print, compile and download objects and object relationships and the invention's generated reports contained in the invention's document object model archive;

10. Enable users to establish circumstances, characteristics and criteria associated with instances of user's accessing, viewing, editing, manipulating, replacing, printing, compiling and downloading archived objects and object relationships to be contained in reports generated, distributed and archived by the invention to facilitate managing the invention's use;

11. Enable users to establish circumstances, characteristics and criteria associated with instances of user's editing, manipulating, replacing, compiling and downloading archived objects and object relationships to be contained in reports generated, distributed and archived by the invention to facilitate the management of object and object relationship versions over time; and 12. Enable users to establish rules and standards for the number of instances of user's editing, manipulating, replacing, compiling and downloading archived objects and object relationships that are to be retained in the invention's import reconciliation records.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 2, 2A-2D are over-all blocks and functional diagrams of the system in accordance with the present invention;

FIG. 3 is a flow diagram illustrating aspects of document import processing in accordance with the present invention;

FIG. 4 illustrates a data structure usable in the system of FIGS. 1, 2; and FIGS. 5, 5A-5B illustrate document process details in accordance with the present invention.

DETAILED DESCRIPTION OF THE PREFERRED EMBODIMENTS

Figure 1:
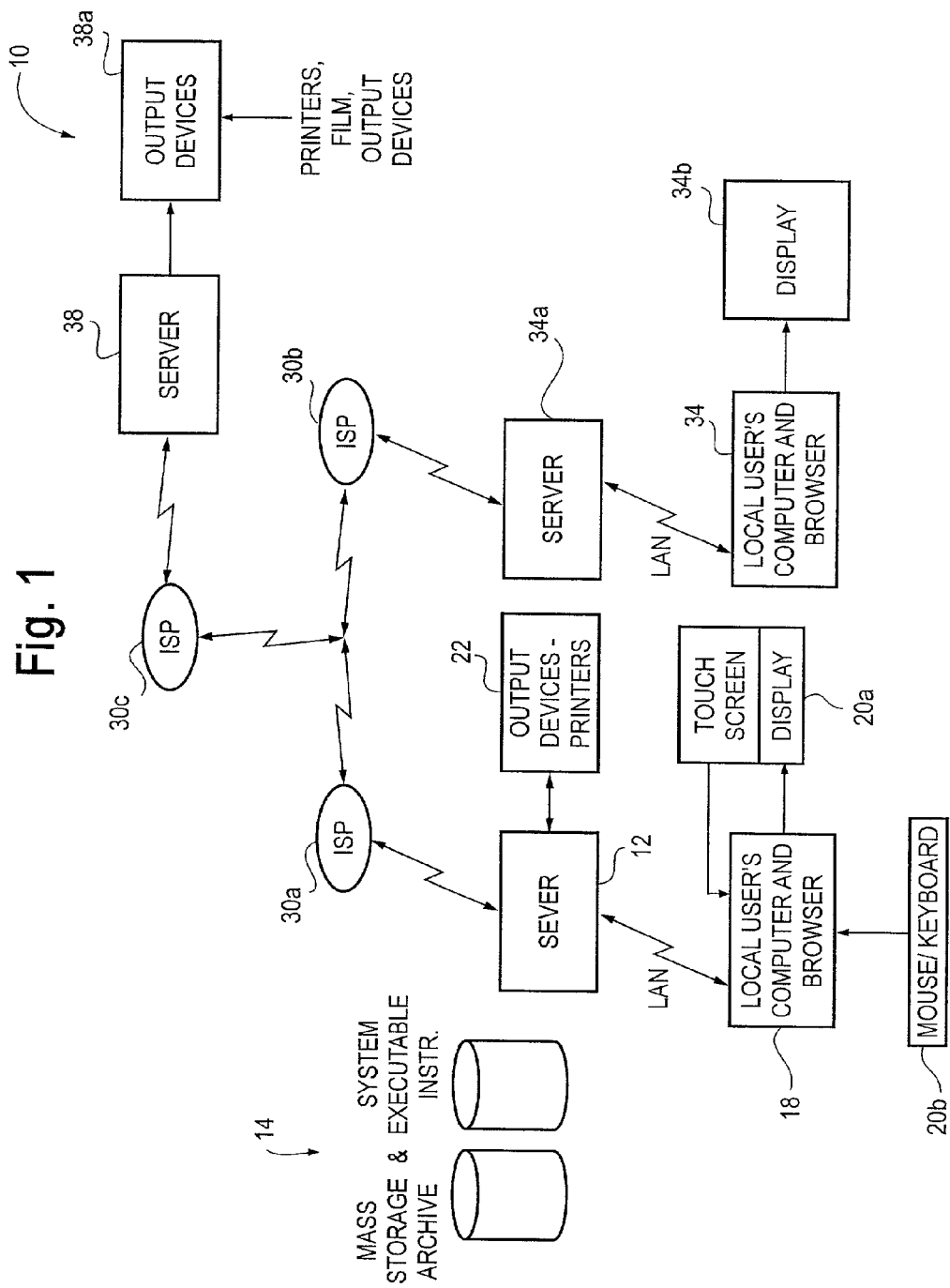
FIG. 1 is an over-all block diagram of a system in accordance with the present invention.
Figure 2C:
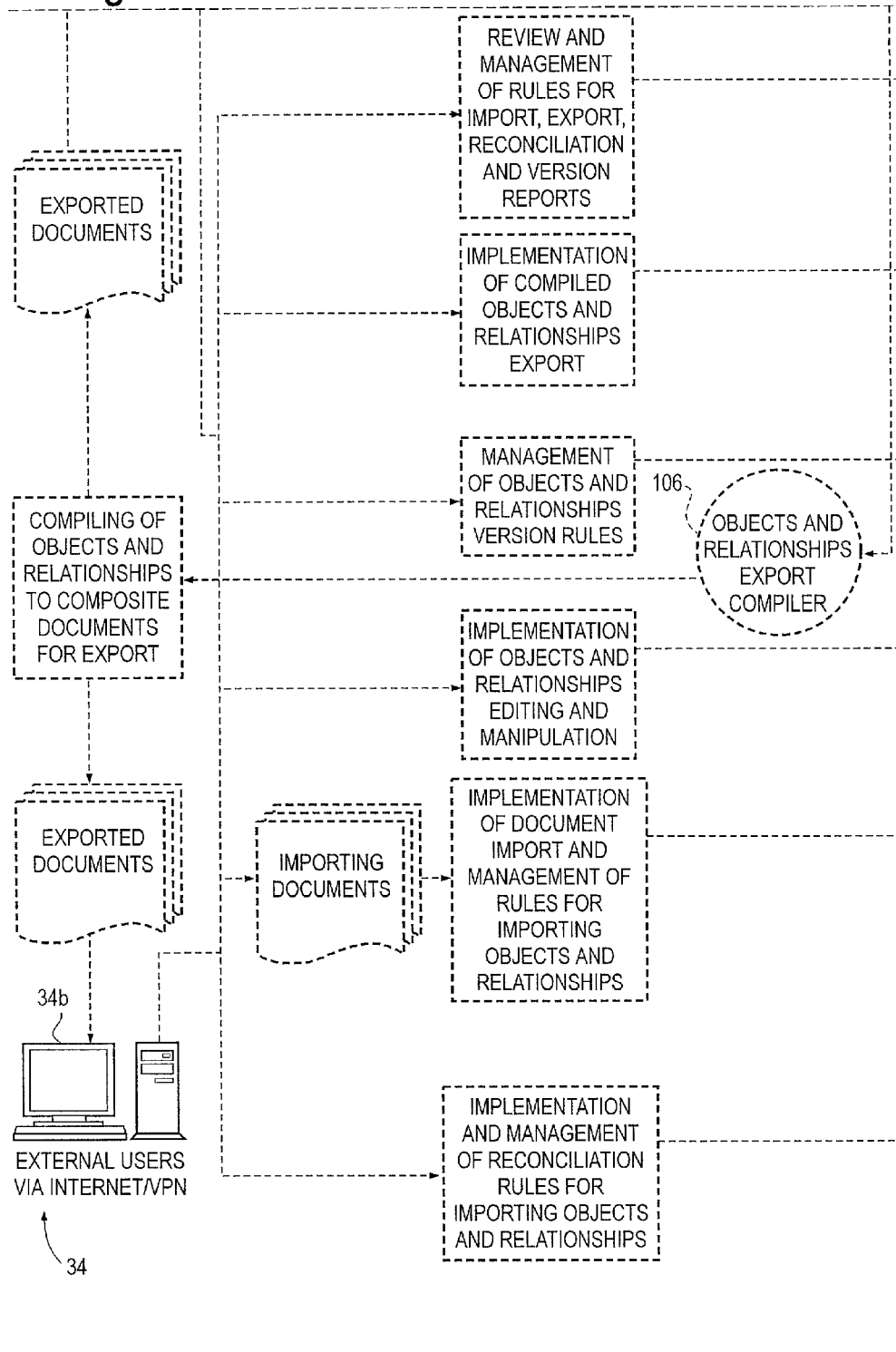
Figure 2D:
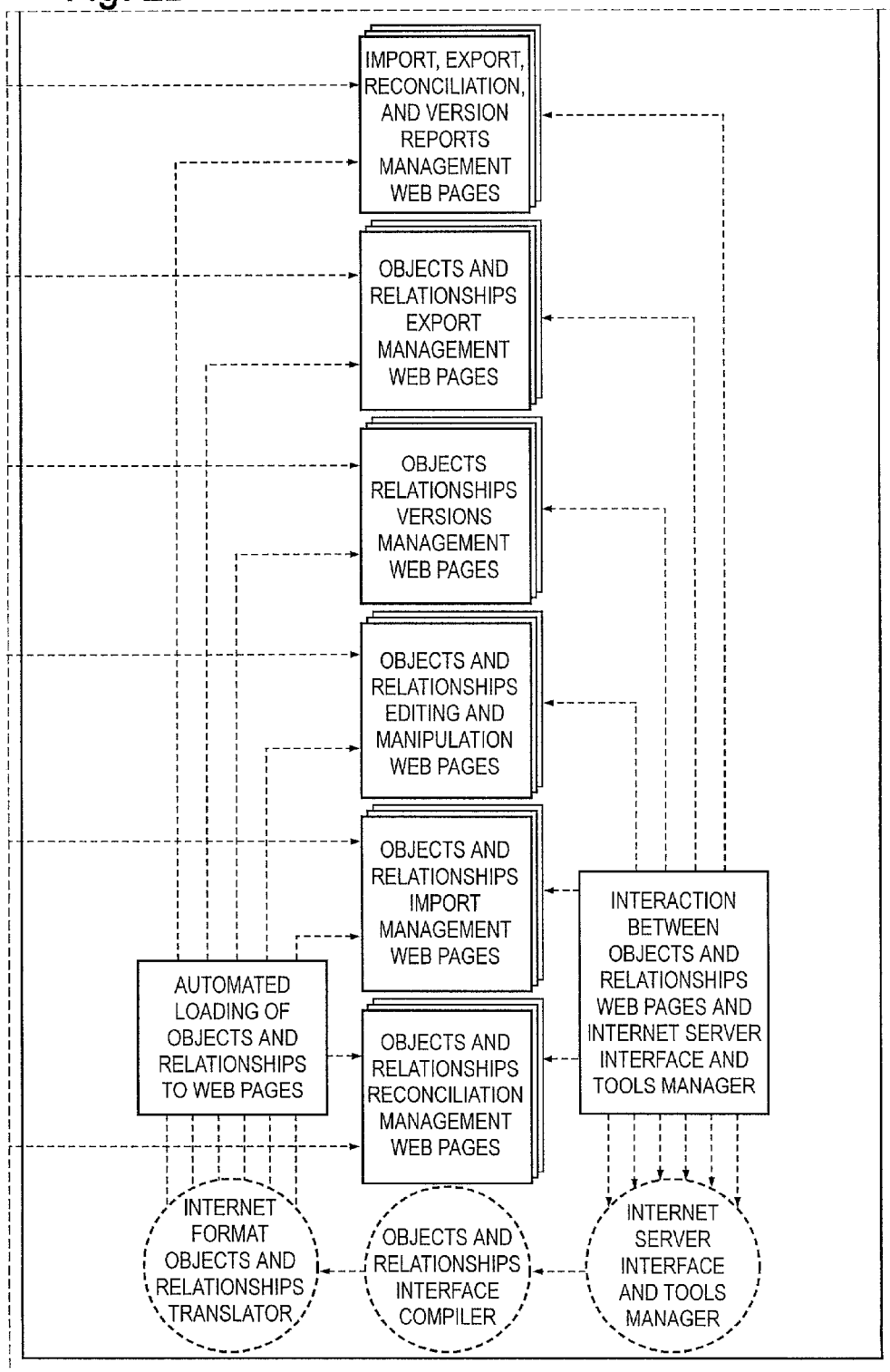

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

While a system and method are is described herein, at times in terms of PostScript-type inputs and outputs, it will be understood that these references are merely explanatory. As those of skill in the art will understand, other input and output languages could be used without departing from the spirit and scope of the present invention. The system also incorporates executable instructions to compile the object-oriented PostScript data to composite documents, elements and/or element groups which can then be displayed at graphical user interfaces for inspection and modification. Other instructions enable output in composite PostScript-type file formats and to Postscript devices. It will also be understood that while a preferred data structure is disclosed and described, other data structures are usable without departing from the spirit and scope of the invention.

A method and computer system are described for a single user and/or networked groupware system and work methods for digital asset/content management and content manipulation. It incorporates functionality to translate parse and tag native PostScript documents and documents converted to PostScript file format to a unique object-oriented PostScript data model, which incorporates Document Metadata, Document Properties, Document Property Values, Document Element Specific Metadata, Document Element Properties and Document Element Property Values.

Once converted to the unique object-oriented data model, the system archives the data, provides software and methods for document and element display to a user interface for document and element modification and adds additional metadata to document and element components. These added components enable document and element searching, version management. Output can be provided in the form of PostScript-type documents. The output files can be directed to PostScript compatible devices.

The system and methods also provide, capability by other executable instructions to efficiently and/or automatically search, compare and reconcile its object-oriented PostScript data as well as to store, distribute, create and edit its object-oriented PostScript data and/or data groups, which are referred to herein as documents, document properties, document property values and elements, element properties and element property values.

The system translates and imports non-object oriented document file formats to a preselected standard, which could be PostScript-type code, from which, it is parsed and tagged to an object oriented PostScript data model. The model makes distinctions between documents, document properties, document property values and elements, element properties, element property values.

The system translates object oriented documents, document properties, document property values and elements, element properties, element property values to composite documents and/or elements to graphic arts industry standard file formats such as PostScript and PDF. The system compares documents, document properties, document property values and elements, element properties, element property values upon import and provides users with notification of document and/or element redundancies and provides user interfaces and tools for examining and choosing the elimination of document and document element redundancies. The system compares documents, document properties, document property values and elements, element properties, element property values upon import and, based on pre-determined selections made in provided user interfaces and tools, automatically eliminates document a and element redundancies.

The system provides user interfaces and tools that allow users to establish rules for imported documents and/or elements involving combinations of documents, document properties, document property values and elements, element properties, element property values.

The system also has a capability to compare documents, document properties, document property values and elements, element properties, element property values upon import. It also provides users with notification of document and/or element non-compliance with user established rules and provides user interfaces and tools for examining and choosing the reconciliation of documents and elements to user established rules. The system also compares documents, document properties, document property values and elements, element properties, element property values upon import. Based on pre-determined selections made in user interfaces and tools, the system automatically reconciles documents and/or elements so as to comply with user established rules.

The system provides user interfaces and tools, which enable users to concurrently apply text and graphic edits to multiple common and/or similar, non-matching, documents and elements in the archive. The system incorporates user interfaces and tools, which allow users to concurrently effect text and graphic edits in similar, non-matching, document elements, in the archive by editing a single document.

The system includes user interfaces and tools, which allow users to create new documents and/or elements based on existing documents and/or elements. The system also incorporates user interfaces and tools, which enable remote workflow participants to upload documents, download documents, initiate requests for document project work, access project status reports and execute text edits to documents and/or elements through their Internet browsers.

The system incorporates user interfaces and tools, which allow user/administrators to automatically track the nature of all final user and remote workflow participant edits or modifications executed on archived documents and elements. It also incorporates user interfaces and tools for accessing reports and charts of this tracking information. The system incorporates user interfaces and tools, which allow for the recording of any user/administrator designated number of document versions. It is also possible to retain information about version differences such as information identifying the version's originator, information about the computer and network of the version originator and information about the user/administrator defined execution type or workflow step associated with the version as well as, in the case of edits or modifications made to archived documents or document components, the nature of the edits or modifications made.

The data model, on which the invention's standard document file format parsing takes place, is based on making distinctions between Document Specific Data and Metadata, Document Properties, Document Property Values, Element Properties and Element Property Values. To these distinctions separate data-sets are established for Archived Document and Element Metadata, Document Construction Metadata and Element Specific Metadata, to aid in searching the archive for documents and elements as well as to aid in compiling composite documents and elements for export and to facilitate user interfaces for work execution.

It should be noted that the invention's objects and relationships data model is a model, which makes possible the invention's unique approach and related benefits as a digital asset/content management system. Although this data model may be determined to have value in the architecture of the invention's objects and relationships archive, more efficient architecture for establishing this archive and differentiating its content may also be determined. For the sake of making the data-set needs necessary to realize the unique benefits of the invention, the following distinctions, descriptions and function/features are provided.

Archived Documents and Element Metadata-Addresses describing information about the documents and elements necessary to search the system's archive. This information is automatically established through a combination of information provided in the document's header, text (indexed document text) found within the document or through manual user provided descriptions entered into document import forms. For automatic entry, users and/or administrators (based on security assignments) can select any combination of header information or any document text content (key words or phrases) for inclusion in Archived Documents and Elements Metadata lists or search forms. For manual user provided descriptions the document import forms design interface allows users and/or administrators to determine the number of form fields and field names they require as well as to establish value lists for data entry or text entry fields.

Document Construction Metadata—Provides unique identities for combined sets of and sequences of Element Specific Metadata as well as Document Specific Data and Metadata. The Document Construction Metadata is useful for expediting the compiling of documents into composite form for document export as well as for facilitating the compiling of documents and elements for the user interfaces involved with executing work. The information contained in the Document Construction Metadata is derived from the object tagging schema applied in the Document Code Parser and is based on establishing unique relationship identities for the sets of Document Specific Data/Metadata and Element Specific Metadata.

Document Specific Data and Metadata—Provides unique identities for combined sets off Document Properties and Document Property Values. The Document Specific Data and Metadata also is intended to expedite compiling documents and elements to composite form for document export as well as for user interfaces.

Element Specific Metadata—Provides unique identities for combined sets of Element Properties and Element Property Values. As is the case with Document Construction Metadata and Document Specific Data and Metadata is intended to expedite compiling documents and elements to composite form for document export as well as for user interfaces related to element and document work execution.

Document Properties—Contains basic reference information essential for defining a document. It includes such categories as document pages, document layers, document resolution, document color space (color model) and document orientation (landscape/portrait). Also, in some cases Document Properties would contain reference to the presence of so called document live area, bleed area and document trim area. Document Properties does not contain any specific values relative to these properties, it simply contains reference to these property factors.

Document Property Values—Contains the specific values associated with Document Properties. Document Property Values includes such information as the number of pages in the document, the number of layers, the numeric value of the document's resolution determination of the document's orientation as being either landscape or portrait and the document's dimensions as well as the dimensions for the document's live area, bleed area and trim area and the page position for the document's live, bleed and trim areas.

Document Version Metadata—Contains the information necessary to establish differences between different versions of documents. Included in this are the date and time in which the version was imported, the workflow step involved with the version work execution, the name of the individual importing the document, the individual's company name and information involving the identity of the user computer involved with the document import.

Element Properties—Contains basic reference information essential for defining an element. It includes such categories as reference to the element's "L" and "W" dimensions, its "X" and "Y" position on the document page, reference to the page on which the element appears, the layer on which the element appears, the element's color space (color model), the element's type (text element, vector element, raster element or placed image element), the element's shape type (rectangle, circle, 5-point polygon with 5 straight connecting lines) etc. Also included in Element properties are references to element type properties such as; in the case of text elements, the font reference, the type size reference, the leading (line spacing) reference, reference to the type's tracking; in the case of placed image elements, reference to the placed image's color space, resolution file format, colors contained etc.

Element Property Values—Contains specific values associated with element properties. As is the case with Document Property Values, Element property values includes such information as the numeric value of the element's resolution, the numeric values of its height and width, the numeric values of its position on the page the page number and layer name on which the element appears as well as the element type specific values associated with; in the case of text, point size, leading points, tracking values, etc.

Element Version Metadata—Contains the information necessary to establish differences between different versions of elements. Included in this are the date and time in which the element was imported, the workflow step involved with the element work execution, the name of the individual importing the element the individual's company name and information involving the identity of the user computer involved with the element import.

Added to the above are User Defined Document Rules and User Defined Element Rules components, which respectively identify combinations of document properties and related values as well as element properties and related values established by user/administrators as requirements for certain types of documents and elements. The types of documents and elements for which user defined rules are to be applied are determined by the user/administrator, through interfaces and tools, which allow the user/administrator to identify the document, document property, document property values and/or element, element properties and element property values that constitute matching criteria for applying document or element rules. Additionally, the user/administrator has the ability to designate any combination of properties and/or values as constituting a rule.

Also incorporated in the system, is a Temporary Import Records component. This component exists to facilitate the temporary storage of the parsed and tagged objects and relationships that are in the process of being imported into the system archine and are either inconsistent with user-established import rules, which addresses such issues as:

a. Redundant objects and/or relationships derived from multiple documents associated with a "batch-mode" import;

b. Redundant objects and/or relationships derived from previously imported and archived in the invention's objects and relationships data-modeled archive;

c. Objects and/or relationships being imported, which are judged by the user to have been inaccurately executed in the original document authoring application;

d. Objects and/or relationships being imported, which require clarification due to either anomalies in the original document authoring application relative to the invention's parsing and tagging component; and e. The need to establish combinations of objects and/or relationships to be combined for treatment by the invention as though they were single objects and/or relationships.

As is established later in this document, the user has the option of either designating a rule violation for manual, user-executed reconciliation or correction, or designating a rule violation for automated reconciliation or correction, which is to be executed by the invention.

So as to reduce the time and effort necessary to populate the system's archive with existing documents, a batch-mode conversion is provided. Various types of document formats are converted to the systems standard input data format for loading into the archive.

The system enables users to activate third party OS level scripting applications such as AppleScript to designate folders and volumes as hot folders or watched folders. Through these features documents already resident in properly designated folders or volumes as well as documents drug or saved to properly designated folders or volumes begin the importing process.

The system enables users to designate folders or volumes as "hot folders" for the importing the documents contained therein. As a result, documents resident in folders or volumes designated as hot folders are automatically brought into the import process.

Users are able to designate specific folders or volumes as "watched folders". As a result, documents moved to watched folders or volumes or documents saved from applications to watched folders or volumes are also brought into the system's import process.

In order to enable designers, operators and users throughout a graphics workflow to "file" documents to the system's archive, regardless of their physical proximity to the system, a FTP option for document archiving is also provided. In providing this capability, FTP uploads transacted from the Internet, are uploaded to watched folders or volumes through the system's' archive import management interface.

Documents being imported into the system's archive are next converted to the system's standard input language, such as PostScript (Vector), EPS (raster) formats or PDF format documents as the archive administrator designates through the system's import management interface.

In order to provide effective management of features use and to facilitate version tracking in the system as well as system Management. Users are required, for first time use, to fill out a user registration form. For users uploading or down loading documents from the system's integrated Internet FTP capability, only the browser-based interface option is possible.

To receive general access privileges and to effect file downloads, users are required to provide such information as their name, title, company name and the function they have in the graphics design and/or production workflow as well as to indicate identification of their primary and any secondary access computers they will be using to work with system assets. Such security-related system information as the setting of cookies, determination of system IP addresses is establish as well as system configuration, and access route server data and other identity related information is determined.

Users are also required to establish user names and passwords for access to the system. Additional security-related capabilities such as provision for user encryption keys and certificates can be provided as would be understood by those of skill in the art.

As users complete filling out the system's access privileges request form, their personal, system(s) and server related information is held as temporary system access request records, within the system's Access Administration capability. As the system's administrator logs in, the access administration interface notifies the administrator of any pending requests for access privileges assignment. Within this interface, the administrator can assign access privileges inclusive of any combination of the following:

- View, print, upload, download, edit and/or create single and/or multiple documents only
- View, print, upload, download, edit and/or create single and/or multiple elements only
- View, print, upload, download and/or edit single and/or multiple documents and elements
- View, print, edit and/or establish document and/or element design standards
- View, print, edit and/or establish document and/or element reproduction specifications
- View, print, edit and/or establish document and/or element auto-preflighting and notification settings
- View, print, edit and/or establish document and/or element auto-preflighting and auto-correction settings In addition to the administrator having the ability to establish user access privileges on a request basis, the administrator can also pre-determine access privileges for any group or individual based on any combination of user access privileges request form fields. This allows the administrator to choose to be unavailable to establish access privileges at the time the access privileges are requested.

Once documents are converted to the system's standard input language or format, for example PostScript, the import process affects the parsing and tagging of code components in accordance with the system's data model. This process requires the pre-determination of input language characteristics to implement the parsing. Parsing is consistent with the system's data model.

Given the fact that the sizes of many pre-existent archives can involve tens to hundreds of thousands of documents, the importance of automating document importing and minimizing user involvement can't be stressed enough. A big part of the reluctance of many companies to invest in digital asset management systems is the time and cost involved with populating the digital asset management system prior to being able to use its features. This is a problem which can be cost effectively overcome using the present system and method.

a. Document Import Status and Results Reporting

So as to apprize users of the status of the import of pre-existent archives as well as for batch-mode drag and drop import, the system's Import Manager interface can provide a count of the total number of documents being imported, the number of documents imported at any point in the import process and the time remaining to complete the importing of documents.

So as to allow users to effectively manage the conversion of documents to related component objects, they will need to be apprized of the results of the parsing of code components into objects and relationships. An interface feature can be provided whereby users have the option to view parsed documents in composite form or as a list of visually displayed graphics elements with associated properties and property values in text form. Also the import report interface can include a count of like and/or similar elements either already present in the system's archive or involved with the batch-mode import.

b. User Involvement in Identifying Elements

Initially, user involvement with the import process will, in part, be greater until the users become "comfortable" with system's approach dealing with documents and elements. In addition, it is likely that direct user involvement will be necessary in early-phase importing of pre-existent archives and on going for importing certain types of documents.

In early phase importing of pre-existent archives, users are likely to see that there are a number of instances of variation between elements in different documents that are the result of mistakes made in the creation or editing of documents. As a result, the user will need to be able to identify the instances of mistake-based element variations, to replace incorrectly executed elements with correctly executed elements and to "educate" the system so that it is able to identify similar mistakes as well as to automatically replace incorrectly executed elements with correctly executed elements. The system's Import Manager interface can provide the ability for the user to designate certain element properties and values as the "rules" for correctly executed elements. In this way, for example, the user should be able to establish that the shape of an element is a rule but the color, size and position of the element are not part of the standard.

Users will need the option of either having the system report on its comparison findings so that users can "control" the reconciliation process. Alternately, if they choose to do so, they will need to be able to establish the properties and values for documents and elements that will be automatically reconciled. Users will be able to choose any combination of document or element properties and values in establishing the criteria for automated reconciliation.

c. Establishing Multiple Elements, Elements with Compound Paths and Grouped Elements as a Single Element Object.

Elements, which are comprised of multiple elements, elements with compound paths and/or grouped elements represent a special need for user involvement with the import process. Again, the users ability, with the system's Import Manager interface to select multiple elements, elements with compound paths and grouped elements, via a mouse/cursor GUI, and "instruct" the system that the selection should be treated as a single element will be necessary. The user's ability to create a rule that any other such multiple elements, elements with compound paths and/or grouped elements should also be treated as a single element will be useful to avoid users having to make this association over and over again.

d. Establishing Document Layers as a Single Element or as an Element Super-Set.

As is the case for multiple elements, elements with compound paths and grouped elements, users will have an ability to designate document layers as a single element object. This will be particularly valuable for service providers providing color separation or trapping services. Additionally, there may be benefits to both color separation service providers as well as assembly/keyline service providers to establish an element "super set" that can, as needed, be treated as though it were a single element and which can, on other occasions, be treated as separate elements. This feature is seen as being particularly valuable to color separators and rotogravure cylinder engravers in helping them to identify element combinations, within the system's archive that can be used in the execution of newly received documents.

In the case of cylinder engravers, this feature would enable engravers to identify previously executed cylinder engraving programs and/or cut cylinders that can be used to eliminate work effort on newly received documents requiring their services. An interface feature that would aid in making this super set feature possible enables users to be able to view and work with documents on a layer by layer basis.

5. Comparing Like and Similar Documents and/or Elements and Eliminating Redundancies.

One aspect which promotes system efficiency in archiving as well in the execution of work on archived documents and elements is the fact that there is only one of every unique document or element in the system's archive. Unlike other types of digital asset management systems, Hence, the present system is not encumbered with redundant documents or elements.

In order to bring about this elimination of redundancies, the system is able search all of its document and element related records in order to identify like and similar documents and elements. It can either report its findings for users to "control" the elimination of redundancies or to allow users to establish any combination of document and/or element properties and values as the necessary criteria for automated redundancy elimination.

Aside from system efficiency, which results from the elimination or document and element redundancy, The system's data model provides an extremely efficient means for archive searching as well as for comparing and executing work on documents and elements.

6. Establishing Design and Reproduction Rules and Reconciling Documents and/or Elements to Established Rules.

In this aspect of the system, users can in effect not only identify and correct pre-archived documents and their respective elements to maintain design continuity and compliance with reproduction specifications through out the archive, they can also establish a means to automate the preflighting process involved with documents provided by other participants in a number of possible graphic design and production workflows.

a. Establishing Design Rules or Standards.

The features necessary to establish design rules or standards are identical to the features identified in previously discussed section 4.

b. Establishing Reproduction Rules or Specifications.

So as to render the establishment of reproduction specification rules most useful, users will be able to establish sets of rules relative to a fairly broad number of different reproduction processes. In addition to being able to establish reproduction specification rules for the better known reproduction processes of lithographic, rotogravure and flexographic printing, users should have the ability to establish rules for less well known reproduction processes like silk screening, and embroidery as well as for Web publishing. Again, virtually any document or element properties as well as property values could be included in establishing reproduction specification rules.

c. Reconciling Documents and/or Elements to Established Rules.

So as to render the establishment of reproduction specification rules most useful, users will be able to establish sets of rules relative to a fairly broad number of different reproduction processes. In addition to being able to establish reproduction specification rules for the better known reproduction processes of lithographic, rotogravure and flexographic printing, users should have the ability to establish rules for less well known reproduction processes like silk screening, and embroidery as well as for Web publishing. Again, virtually any document or element properties as well as property values could be included in establishing reproduction specification rules.

The possible automatic reconciliation of documents provided by the system is something which users are likely to find foreign. They are likely to find it useful to use interface features that allow them to easily look at documents and elements both in the ways that they have been doing and in the new ways necessary to make full use of the system's more efficient document processing. Additionally, users will feel more comfortable and therefore more easily and quickly make the shifts in thinking necessary to make full use of system automatic features if they are able to reassure themselves that system automated features are working "correctly".

To address the above, the system interface for document and element reconciliation to design and reproduction rules as well as for preflighting provides users with the option to review the results of single or multiple document and/or element comparison to rules prior to reconciliation. Users will also be able to establish parameters for an automatic reconciliation to rules on an incremental basis, such that any combination of document and element properties and/or property values can be chosen for automatic reconciliation.

Features of the present system include:

1. Converts importing documents to the invention's base document file format as the first step of the invention's import process;
2. Parses the base document file format of importing documents in accordance with the invention's document object model;
3. Enables users to establish circumstances, characteristics and criteria associated with importing objects and/or object relationships so as to determine the nature of the invention's analysis and comparison of importing documents;
4. Enables users to establish information, derived from the invention's analysis and comparison of importing documents, that will be reported, distributed and archived in the invention's document object model archive;
5. Enables users to establish the circumstances, intervals and distribution lists that are to be applied to reports derived from the invention's analysis and comparison of importing documents;
6. Enables users to establish rules and standards to used as the basis of differentiating, clarifying, correcting and eliminating redundancies associated with objects and object relationships derived from importing documents prior to their being archived in the invention's document object model archive;
7. Enables users to establish circumstances, characteristics and criteria, derived from the invention's analysis and comparison of importing documents and relating to user-established rules and standards, whereupon object and object relationship differentiation, clarification, correction and redundancy elimination will be effected by manual or automated means;
8. Enables users to access, view, edit, manipulate, replace, print, compile and download objects and object relationships contained in the invention's document object model archive;
9. Enables users to establish security-related privileges and rules effecting the invention's allowing or disallowing individual users or groups of users to access, view, edit, manipulate, replace, print, compile and download objects and object relationships and the invention's generated reports contained in the invention's document object model archive;
10. Enables users to establish circumstances, characteristics and criteria associated with instances of user's accessing, viewing, editing, manipulating, replacing, printing, compiling and downloading archived objects and object relationships to be contained in reports generated, distributed and archived by the invention to facilitate managing the invention's use;

11. Enables users to establish circumstances, characteristics and criteria associated with instances of user's editing, manipulating, replacing, compiling and downloading archived objects and object relationships to be contained in reports generated, distributed and archived by the invention to facilitate the management of object and object relationship versions over time; and 12. Enables users to establish rules and standards for the number of instances of user's editing, manipulating, replacing, compiling and downloading archived objects and object relationships that are to be retained in the invention's import reconciliation records.

In a packaging context, a system that embodies the invention provides efficiencies from the early phase of packaging design development through platemaking and/or cylinder engraving. The present system improves efficiency by reducing redundancies and rework which encumber known systems. Benefits include:

1. Automatically identifies cylinders and plates from previously produced packaging SKUs, which can be used to reduce turnaround time and cost in the printing of new packaging projects.
2. Automatically identifies color separation document components from previously produced packaging SKUs, which can be used to reduce turnaround time and cost in color separating new packaging projects.
3. Automatically identifies artwork assembly document components from previously produced packaging SKUs, which can be used to reduce turnaround time and cost in executing assemblies for new packaging projects.
4. Automatically reconciles newly executed designs to established design standards and reproduction specifications, which eliminates time consuming and costly rework and print re-runs.
5. Allows for the automatic application of work effort for single documents, across multiple documents in a project or through out the archive, which can radically reduce turnaround time and cost in executing document edits and projects.
6. Automates execution of mid-production text edits, which can eliminate the principal time consuming cause of production work stoppage and rework.
7. Allows customer and services process participants to concurrently execute work Effort on different components of a single or multiple documents.
8. Allows for the automatic conversion of print-graphics documents to Internet standard documents.

FIG. 1 is a diagram of a system 10 in accordance with the present invention. In the exemplary embodiment of FIG. 1, system 10 includes a server 12 which is coupled to mass storage devices indicated generally at 14. The mass storage devices 14 used to store the document archive discussed subsequently as well as executable instructions for processing documents or files in accordance with the invention.

A local user's computer 18 can be coupled to server 12 via a local area network. Computer 18 has associated therewith a display 20a, which might include a touch screen as well as conventional mouse/keyboard 20b. As discussed subsequently, the local user's display 20a can be used for reviewing and evaluating files or documents which have been parsed by the system 10 as part of an importing process.

Coupled to server 12 is one or more output devices 22 which could be implemented as one or more printers, or other output devices, without limitation. As discussed in more detail subsequently, a local user at computer 18 can not only review parsed documents, or files, but can also carry out a one-to-many editing process of object-oriented data stored in archive 14. Subsequently, via executable instructions, the corresponding document or file can be recompiled from the various linked object-oriented elements for example, in any one of a plurality of available output languages, and, output to printer 22.

Server 12 of system 10 can also be in communication, via internet service providers, such as providers 30a, 30b and 30c and the internet with a displaced or remote computer system 34 coupled to server 34a and display 34b.

Alternately, or concurrently, a user at computer 18, via server 12 can be in communication with a remote server 38 coupled to one or more output devices 38a. These could include printers, film output devices or the like for purposes of producing hard copy, multi-color output documents by printers or printing presses.

It will be understood that the architecture of the system 10 of FIG. 1 is exemplary and variations thereon come within the spirit and scope of the present invention.

FIGS. 2, 2A-2D in more detail various characteristics of the system 10. Common identification numerals, relative to FIG. 1, have been used in connection with corresponding elements of FIGS. 2, 2A-2D. FIG. 3 illustrates further details of a document importing process in accordance with the present invention and further supplements the disclosure of FIGS. 2,2A-2D.

With respect to FIGS. 2,2A-2D, 3 a local user at computer 18 can initiate a document import process, step 100. In a step 102, documents to be imported are translated to a standard, predetermined format, or language, for example such as PostScript, to provide a common input for subsequent processing.

The translated documents are parsed and tagged, step 104, to a plurality of objects and relationships relative to one another. The parsed objects and relationships can then be analyzed and compared taking into account the objects and relationships derived from other documents which have been parsed in a concurrent multiple document batch-mode input process.

The objects and relationships can also be analyzed and compared by the objects and objects relationship manager software 50 in accordance with objects and relationships derived from previously imported documents contained in the system's archive 14. Objects and relationships in the import repository can be analyzed and compared in accordance with user-established rules and standards for purposes of clarification and differentiation of object and object relationships. The objects and relationships in the input repository 52 can also be analyzed and compared using user-established rules and standards pertaining to object and relationship integrity and accuracy. Additionally, objects and relationships in the input repository 52 can be analyzed and compared to objects previously entered into the archive 14 in accordance with user-established rules to minimize redundant objects and object relationships which are stored in the archive 14.

By eliminating redundancy in the archive 14, system operating efficiency will be improved, storage costs will be reduced and a one-to-many editing process can be implemented wherein a singular linked object, common to many documents or files, can be edited once and have the consequence of the editing process propagate through all of the linked documents and files. The one-to-many editing capability substantially reduces effort needed to up-date files which represent packages or packaging manuals or the like as would be understood by those of skill in the art.

Prior to entry into the archive 14, the User Objects and Relationships Management Interface 54 can provide hard copy reports or visual displays of objects and elements for users to carry out real time editing thereof. Users as a result can manually reconcile objects being imported with previously imported objects in the archive or with user-established rules or standards. Alternately, the process can be carried out automatically. Finally, reconciled objects and object relationships can be moved from the importing objects and relationships repository 52 to the document objects archive 14.

With respect to FIGS. 3, 4, the system 10, 10' stores objects and object relationships utilizing a multi-element data structure which incorporates element specific metadata 60a, element properties 60b and element property values 60c. Additionally, the data structure incorporates document-specific data and metadata 62a, document properties 62b and document property values 62c. Tags associated with object oriented data structures by the parser and tagger 104 are carried therewith and enable linking and retrieval of object oriented data structures from archive 14.

Linked objects and relationships can be assembled and compiled using export compiler 106 to create compiled exported documents or files in standard formats or languages such as PostScript-type languages if desired. It will be understood that the present object-oriented data structures and relationships, stored in archive 14, provide for efficient content management in accordance with the system's one-to-many editing capability.

With respect to the various data structure, elements 60a, b, c and 62a, b, c when stored in the archive 14, relationships between the various components are maintained. System operators are thus able to view and manipulate the document components either within the context of a composite document or a separate document elements. As noted above, industry standard file formats are converted to an efficient object oriented data structure for storage in archive 14.

In an effort to clarify some of the principal capabilities, features and benefits of the invention the following attachments are provided:

- A. A printed page black and white rendering derived from a color Demonstration Document, which is used in various ways in this filing to establish further clarification of the invention's functions, its data model and aspects of a user interface.

- B. A printed page, which features a reduced in size visual representation of the Demonstration Document, which includes notations as to the nature and characteristics of the original color version of the Demonstration Document used in providing explanation and examples herein.

- C. A rendering of an aspect of a user interface, which is of the type referenced elsewhere in this filing and which, could be part of an interface set used in the initial assessment, modification and associated management of importing files converted to the invention's standard file format and parsed to the invention's data model

- D. A separate representation of the interface example mentioned in item C, above, which associates data represented in this user interface example with pertinent code line numbers derived from the Demonstration Document once it has been translated to invention's standard file format

- E, A listing of the standard file format code numbers associated with the user interface example contained information, which also provides the specific code lines used to provide the user interface contained data

- F. Two separate renderings, which provide visual representation of key usage benefits involved with the invention's data model and system configuration and which, clarify business-related, work execution efficiencies made possible by the invention.

A.
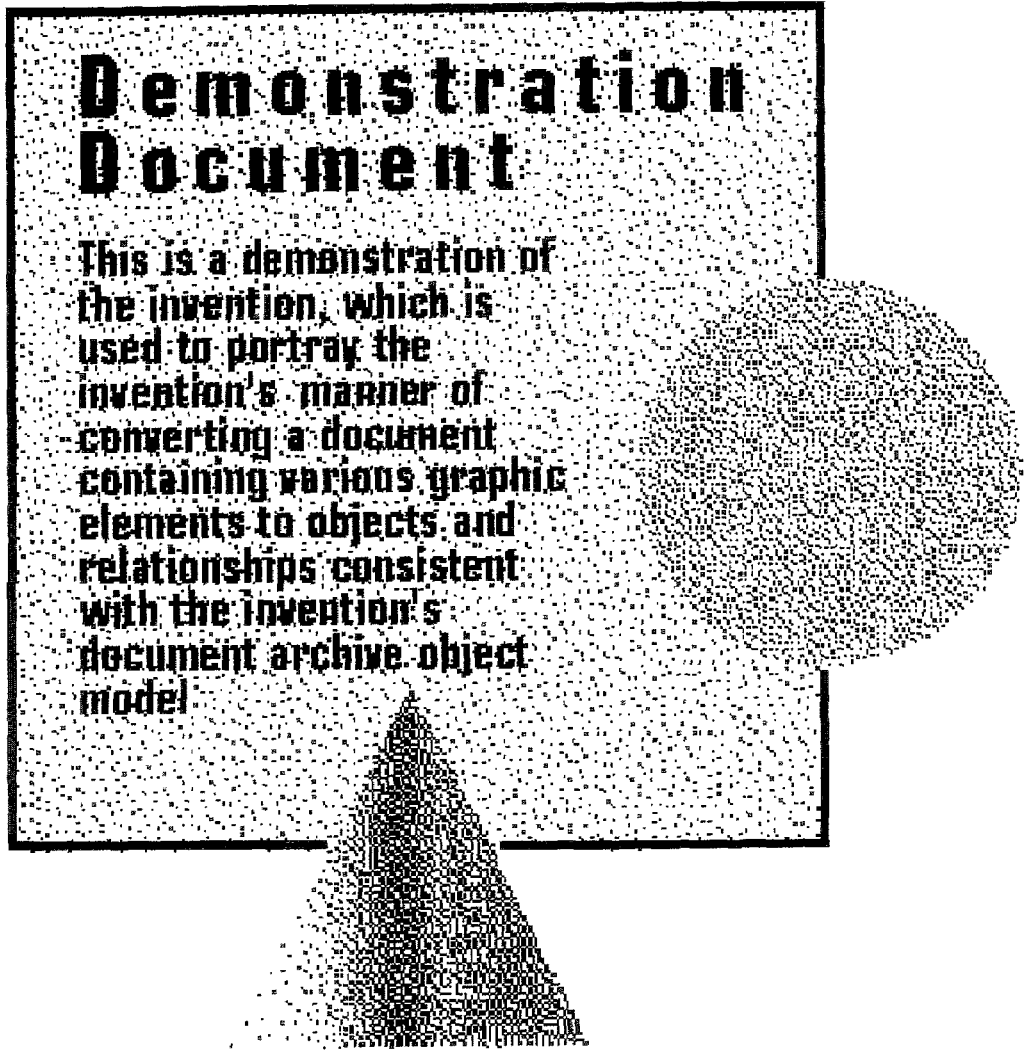

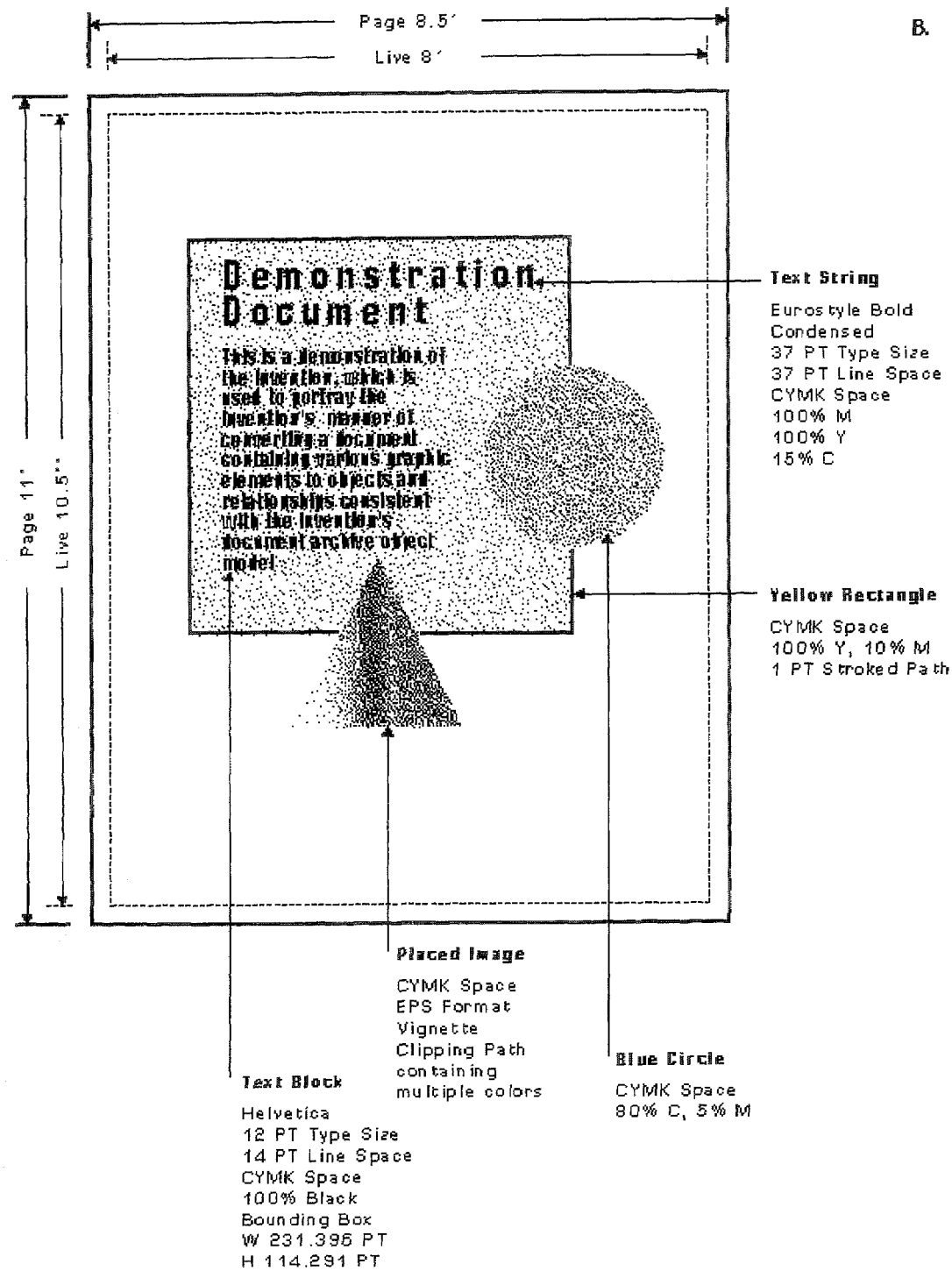

c.

Importing Document:  Document View     Element View

Import Document Data:    Batch Mode    FTP    30 Documents

Name: ................Demonstration Document
Format: ..............Adobe Illustrator, v 8.0.1
Created: .............11:55A Sun, Oct 7, 2001
Modified: ............None
Author: ...............John Doe
Size: ...................8.5' X 11'
Live: ...................8' X 10.5'
Pages: ................1
Layers: ...............5
Color Space: ........CYMK
Resolution: ..........800
Elements: ............5

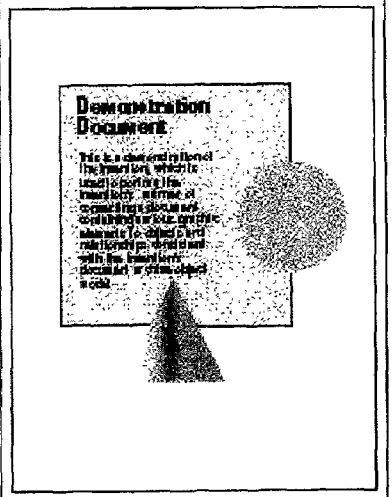

| Layer Names: | | | |
|---|---|---|---|
|  | Yellow Square |  | 3 Import Matches |
|  | Headline | | |
|  | Blue Circle | | |
|  | Body Text |  | 1 Archive Similarity |
|  | Placed Triangle Vignette | | |

| Element Types: | | | | | |
|---|---|---|---|---|---|
|  |  | Rectangle |  | | 13 Import Matches |
|  |  | Text Block |  | | 2 Archive Similarities |
|  |  | Circle | | | |
|  |  | Text String |  | | 3 Archive Matches |
|  |  | Placed Image | | | |

D.

Importing Document: Document View  Element View

Import Document Data: Batch Mode    FTP    30 Documents

| | | |
|---|---|---|
| 2 | Name: ..................Demonstration Document | |
| 3 | Format: ..............Adobe Illustrator, v 8.0.1 | |
| 4 | Created: ............11:55A Sun, Oct 7, 2001 | |
| Note A | Modified: ............None | |
| 5 | Author: ................John Doe | |
| 654 | Size: ....................8.5' X 11' | |
| 16 | Live: ....................8' X 10.5' | |
| 6 | Pages: ................1 | |
| 649 | Layers: ..............5 | |
| 228 | Color Space: ........CYMK | |
| 648 | Resolution: ..........800 | |
| Note B | Elements ............5 | |

| | Layer Names: | | |
|---|---|---|---|
| 5129 - 5150 | | Yellow Square | 5 Import Matches |
| 5151 - 5153 | | Headline | |
| 5197 - 5200 | | Blue Circle | |
| 5216 - 5219 | | Body Text | 1 Archive Similarity |
| 5278 - 5281 | | Placed Triangle Vignette | |

| | Element Types: | | |
|---|---|---|---|
| 5128 - 5131 | | Rectangle | 13 Import Matches |
| 5151 - 5153 | | Text Block | 2 Archive Similarities |
| 5197 - 5200 | | Circle | |
| 5216 - 5219 | | Text String | 5 Archive Matches |
| 5278 - 5281 | | Placed Image | |

2 Title: (Demonstration Document)

Format:
3 Creator: (Adobe Illustrator\250 8.0.1: LaserWriter 8 8.7

Created:
4 CreationDate: (8:53 AM Monday, October 8, 2001)

Modified:
Note Derived from the OS of the system initiating the import

Author:
5 For: (John Doe)

Size:
16 AI5_ArtSize: 612 792 Calculated from points to inches

Live:
645 ADO_ImageableArea: 30 33 582 761 Calculated from "582 761" points

Pages:
6 Pages: 1

Layers:
649 AI5_NumLayers: 5

Color Space:
228 /devc/DeviceCMYK def

Resolution:
648 AI5_TargetResolution: 800

Elements:
Note - Derived from layer data (multiple lines of code)

Layer Data

Yellow Square:
5129 - AI5_BeginLayer
5130 - 1 1 1 1 0 0 1 0 79 128 255 0 50 Lb
5131 - (Yellow Square) Ln
5132 - 0 A
5133 - 1 Ap
5134 - 0 O
5135 - 0 0.1 1 0 k
5136 - 0 R
5137 - 0 0 0 1 K
5138 - 800 Ar
5139 - 0 J 0 j 1 w 4 M []0 d
5140 - AI3_Note:

5141 - 0 D
5142 - 0 XR
5143 - 474.9961 247.0029 m
5144 - 75.9316 247.0029 L
5145 - 75.9316 657.2305 L
5146 - 474.9961 657.2305 L
5147 - 474.9961 247.0029 L
5148 - b
5149 - LB
5150 - AI5_EndLayer--

Headline:

5151 - AI5_BeginLayer
5152 - 1 1 1 1 0 0 1 1 255 79 79 0 50 Lb
5153 - (Headline) Ln
5154 - 0 A
5155 - 0 To
5156 - 1 0 0 1 115 543.75 0 Tp
5157 - 0 Tv
5158 - TP
5159 - 0 Tr
5160 - 0 O
5161 - 0.15 1 1 0 k
5162 - 800 Ar
5163 - 0 J 0 j 1 w 4 M []0 d
5164 - AI3_Note:
5165 - 0 D
5166 - 0 XR
5167 - _ 0 50 XQ
5168 - /_Eurostile-BoldCondensed 37 35.6682 -8.4359 Tf
5169 - 0 Ts
5170 - 100 100 Tz
5171 - 0 Tt
5172 - _ 0 0 100 100 Xu
5173 - AI55J_GlyphSubst: GlyphSubstNone
5174 - 1 TA
5175 - _ 0 XL
5176 - 0 TY
5177 - 0 TV
5178 - 36 0 Xb
5179 - XB
5180 - 0 0 5 TC
5181 - 100 100 200 TW
5182 - 25 TG
5183 - 0 0 0 Ti
5184 - 0 Ta
5185 - 0 1 2 2 3 Th
5186 - 0 Tq
5187 - 240 Tg
5188 - 37 0 Tl 5189 - 0 Tc
5190 - 0 Tw
5191 - (Demonstration \r) Tx 1 0 Tk
5192 - T*
5193 - (Document) Tx 1 0 Tk
5194 - (\r) TX
5195 - TO
5196 - LB
5197 - AI5_EndLayer--
5198 - AI5_BeginLayer
5199 - 1 1 1 1 0 0 1 2 79 255 79 0 50 Lb
5200 - (Blue Circle) Ln
5201 - 0 A
5202 - 0 O
5203 - 0.8 0.05 0 0 k
5204 - 800 Ar
5205 - 0 J 0 j 1 w 4 M []0 d
5206 - AI3_Note:
5207 - 0 D
5208 - 0 XR
5209 - 567.0879 429.791 m
5210 - 567.0879 378.1582 525.2324 336.3037 473.5996 336.3037 c
5211 - 421.9707 336.3037 380.1133 378.1582 380.1133 429.791 c
5212 - 380.1133 481.4229 421.9707 523.2783 473.5996 523.2783 c
5213 - 525.2324 523.2783 567.0879 481.4229 567.0879 429.791 c
5214 - f
5215 - LB
5216 - AI5_EndLayer--

Body Text:

5217 - AI5_BeginLayer
5218 - 1 1 1 1 0 0 1 3 79 79 255 0 50 Lb
5219 - (Body Text) Ln
5220 - 0 A
5221 - 1 To
5222 - 1 0 0 1 116.1621 477.6982 0 Tp
5223 - 0 Tv
5224 - 800 Ar
5225 - 0 J 0 j 1 w 4 M []0 d
5226 - AI3_Note:
5227 - 0 D
5228 - 0 XR
5229 - 347.5576 364.9072 m
5230 - 347.5576 477.6982 L
5231 - 116.1621 477.6982 L
5232 - 116.1621 364.9072 L
5233 - 347.5576 364.9072 L
5234 - n
5235 - TP
5236 - 0 -10.5 Td 5237 - 0 Tr
5238 - 0 O
5239 - 0 0 0 1 k
5240 - _ 0 50 XQ
5241 - /_Helvetica 12 12 -5.3555 Tf
5242 - 0 Ts
5243 - 100 100 Tz
5244 - 0 Tt
5245 - _ 0 0 100 100 Xu
5246 - AI55J_GlyphSubst: GlyphSubstNone
5247 - 1 TA
5248 - _ 0 XL
5249 - 0 TY
5250 - 0 TV
5251 - 36 0 Xb
5252 - XB
5253 - 0 0 5 TC
5254 - 100 100 200 TW
5255 - 25 TG
5256 - 0 0 0 Ti
5257 - 0 Ta
5258 - 0 1 2 2 3 Th
5259 - 0 Tq
5260 - 240 Tg
5261 - 0 Tl
5262 - 0 Tc
5263 - 0 Tw
5264 - (This is a demonstration of the invention, ) Tx 1 0 Tk
5265 - T*
5266 - (which is used to portray the invention's ) Tx 1 0 Tk
5267 - T*
5268 - (manner of converting a document ) Tx 1 0 Tk
5269 - T*
5270 - (containing various graphic elements to ) Tx 1 0 Tk
5271 - T*
5272 - (objects and relationships consistent with ) Tx 1 0 Tk
5273 - T*
5274 - (the invention's object model archive ) Tx 1 0 Tk
5275 - (\r) TX
5276 - TO
5277 - LB
5278 - AI5_EndLayer--

Placed Triangle Vignette:

5279 - AI5_BeginLayer
5280 - 1 1 1 1 0 0 1 4 255 255 79 0 50 Lb
5281 - (Placed Triangle Vignette) Ln
5282 - 0 A
5283 - AI5_BeginPlace
5284 - FileType: 0

5285 - [1 0 0 1 153 112] 0 0 216 216
5286 - (Hard Drive:Desktop Folder:9.01 ThroughPut Patent Effort:Demonstration:Reference Objects:Export Assistant-1.eps)`
5287 - BeginDocument: Hard Drive:Desktop Folder:9.01 ThroughPut Patent Effort:Demonstration:Reference Objects:Export Assistant-1.eps
5288 - !PS-Adobe-3.0 EPSF-3.0
5289 - Creator: Adobe Photoshop Version 5.5
5290 - Title: Export Assistant-1.eps
5291 - CreationDate: 10/3/01 8:03 PM
5292 - BoundingBox: 0 0 216 216
5293 - HiResBoundingBox: 0 0 216 216
5294 - SuppressDotGainCompensation
5295 - DocumentProcessColors: Cyan Magenta Yellow Black
5296 - EndComments
5297 - BeginProlog
5298 - EndProlog Note: Code lines 5299 - 5874 involve extensive data used to calculate the complex Placed Triangle Vignette as well as
extensive instruction sets for printing. They have been omitted from this list.

5874 - EndBinary
5875 - grestore end Image Trailer grestore
5876 - grestore EPS grestore
5877 -
5878 - EndDocument
5879 - ~
5880 - AI5_EndPlace
5881 - LB
5882 - AI5_EndLayer--

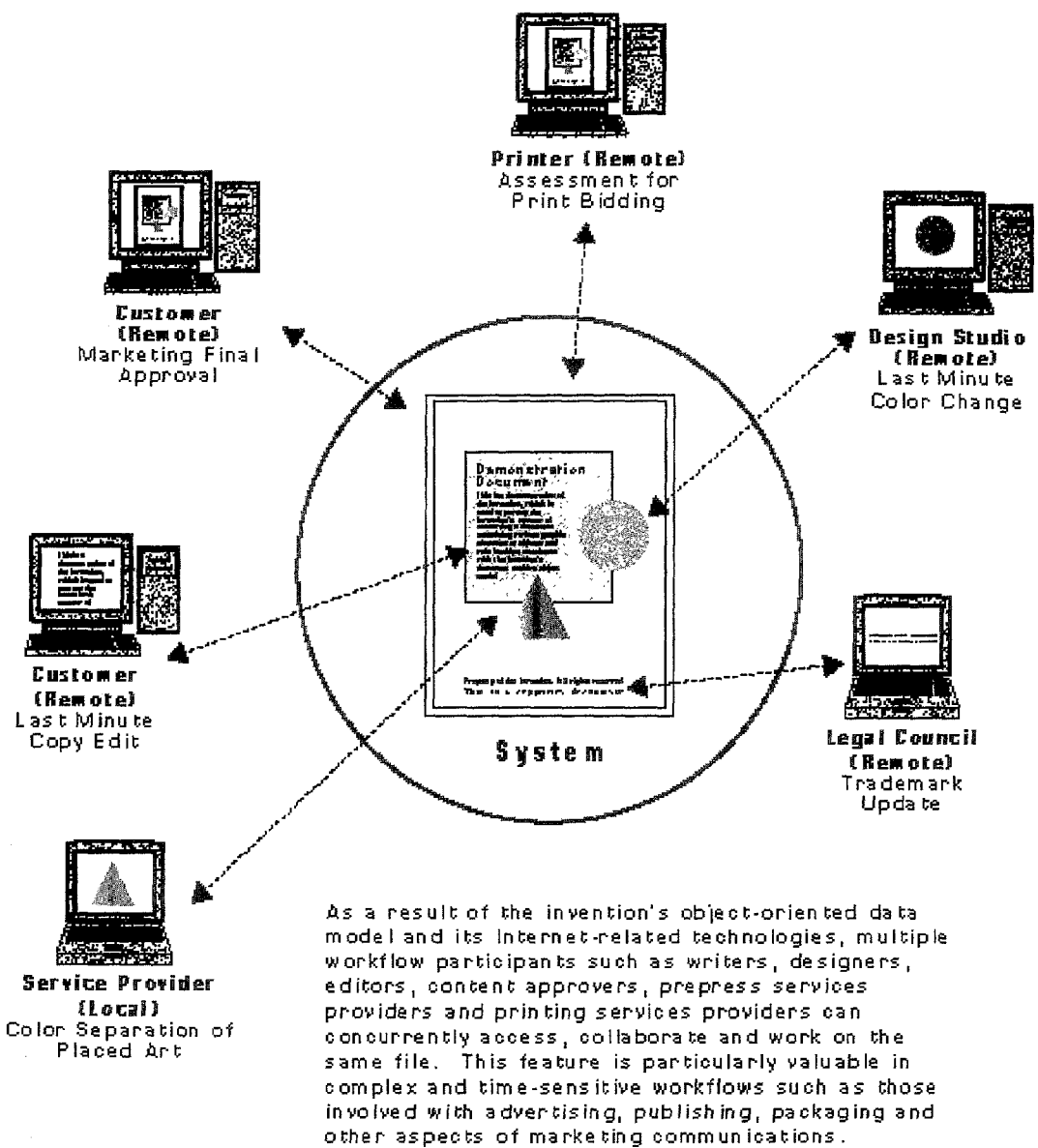

One-to-Many Work Execution to Multiple Non-Matching Files with Shared elements The invention provides for singular instances of archived elements, which can be related to different properties and values. These singular instances of elements are, in many cases, related, through the inventions data model to multiple files in the archive. This approach to digital asset management both reduced requirements for asset storage capacity and enables users to execute a singular work-effort for such things as object modifications, replacements and eliminations and have this work effort automatically applied to multiple files in the archive

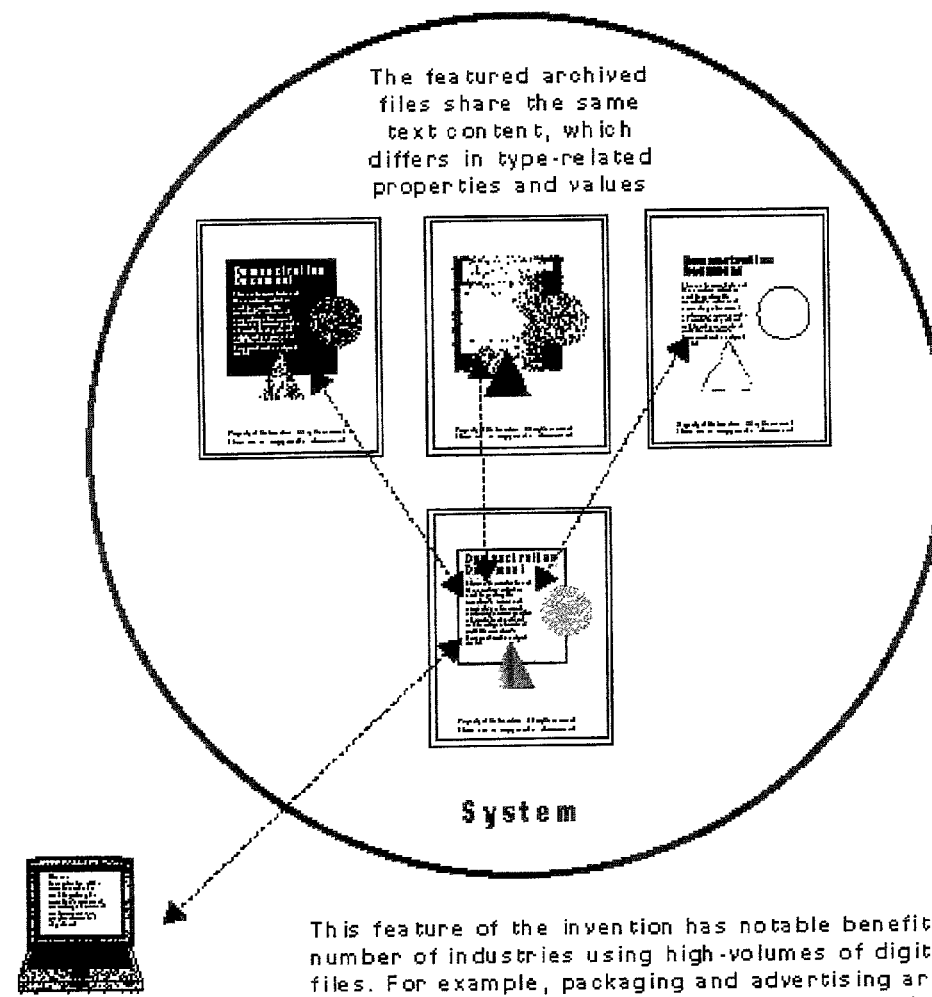

The featured archived files share the same text content, which differs in type-related properties and values System User Executes a Singular Text Edit and Automatically Applies the Execution to Multiple Files in the Archive This feature of the invention has notable benefit for a number of industries using high-volumes of digital files. For example, packaging and advertising artwork files often involve matching text content in multiple document variations. In both cases last minute text changes are frequent and the cost of late file delivery to printers and publishers can be notable. Similarly, this feature can save substantial time and money in implementing logo changes to large volumes of corporate and marketing communication files.

Diagram of Body Text element within its containing layer as converted to the invention's standard file format from the Demonstration Document

Body Text Element Within Layer Code as Converted to Standard File Format:

Begining of Layer → 5217 - AI5_BeginLayer
5218 - 1 1 1 1 0 0 1 3 79 79 255 0 50 Lb
5219 - (Body Text) Ln
5220 - 0 A
Begining of Body Text Element → 5221 - 1 To
5222 - 1 0 0 1 116.1621 477.6982 0 Tp
5223 - 0 Tv
5224 - 800 Ar
5225 - 0 J 0 j 1 w 4 M [l0 d
5226 - AI3_Note:
5227 - 0 D
5228 - 0 XR
5229 - 347.5576 364.9072 m
5230 - 347.5576 477.6982 L
5231 - 116.1621 477.6982 L
5232 - 116.1621 364.9072 L
5233 - 347.5576 364.9072 L
5234 - n
5235 - TP
5236 - 0 -10.5 Td
5237 - 0 Tr
5238 - 0 0
5239 - 0 0 0 1 k
5240 - _ 0 50 XQ
5241 - /_Helvetica 12 12 -5.3555 Tf
5242 - 0 Ts
5243 - 100 100 Tz
5244 - 0 Tt
5245 - _ 0 0 100 100 Xu
5246 - AI55J_GlyphSubst: GlyphSubstNone
5247 - 1 TA
5248 - _ 0 XL
5249 - 0 TY
5250 - 0 TV
5251 - 36 0 Xb
5252 - XB
5253 - 0 0 5 TC
5254 - 100 100 200 TW
5255 - 25 TG
5256 - 0 0 0 Ti
5257 - 0 Ta
5258 - 0 1 2 2 3 Th
5259 - 0 Tq
5260 - 240 Tg
5261 - 0 Tl
5262 - 0 Tc
5263 - 0 Tw

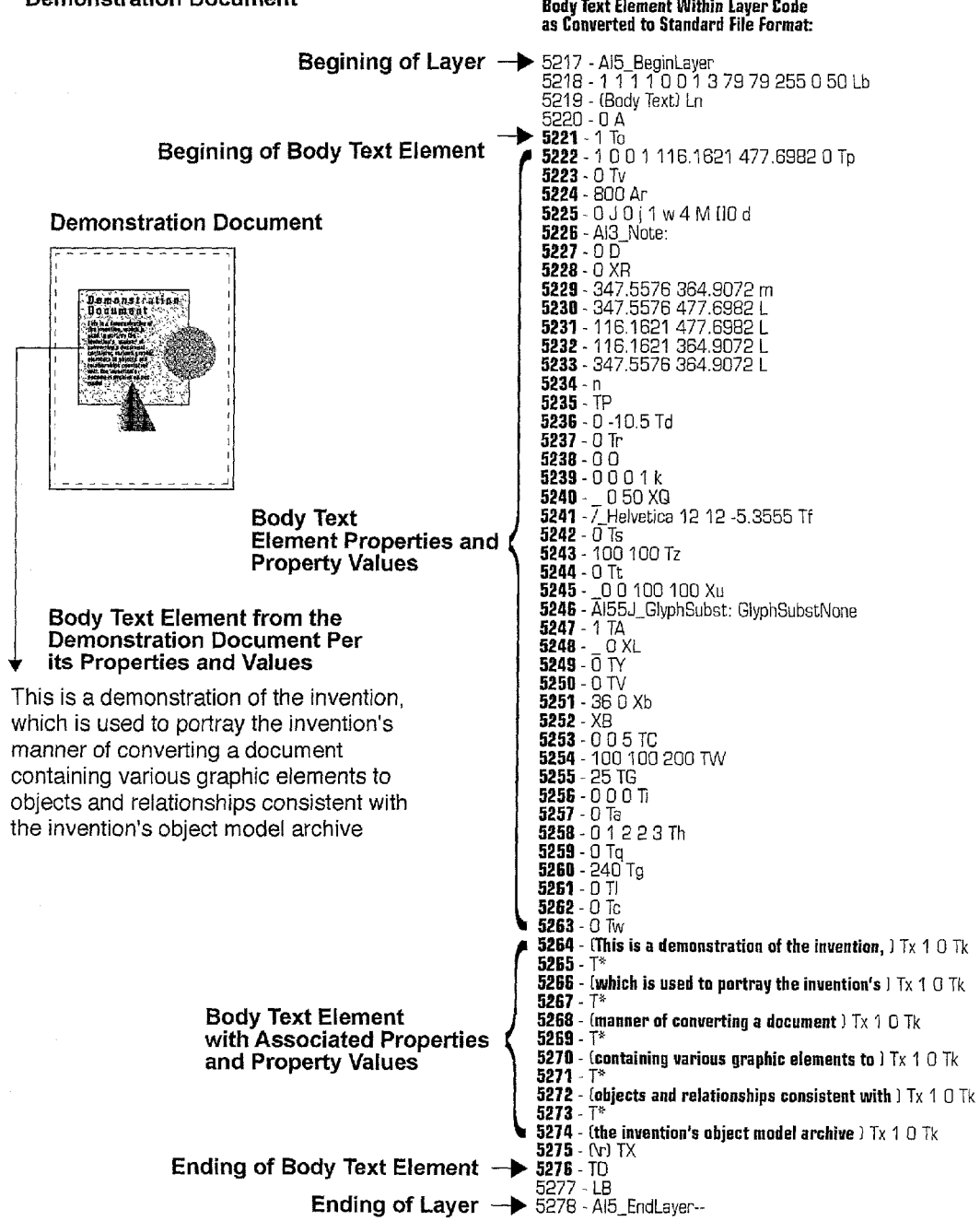

Demonstration Document

Body Text Element Properties and Property Values

Body Text Element from the Demonstration Document Per its Properties and Values

This is a demonstration of the invention, which is used to portray the invention's manner of converting a document containing various graphic elements to objects and relationships consistent with the invention's object model archive

Body Text Element with Associated Properties and Property Values

5264 - (This is a demonstration of the invention, ) Tx 1 0 Tk
5265 - T*
5266 - (which is used to portray the invention's ) Tx 1 0 Tk
5267 - T*
5268 - (manner of converting a document ) Tx 1 0 Tk
5269 - T*
5270 - (containing various graphic elements to ) Tx 1 0 Tk
5271 - T*
5272 - (objects and relationships consistent with ) Tx 1 0 Tk
5273 - T*
5274 - (the invention's object model archive ) Tx 1 0 Tk
5275 - (\r) TX Ending of Body Text Element → 5276 - TO
5277 - LB
Ending of Layer → 5278 - AI5_EndLayer--

A possible representation of the Demonstration Document Body Text element placed in the inventions archive data model following its conversion to the standard file format, parsing and tagging.
Note: References to "T" establish presence of relationship tagging
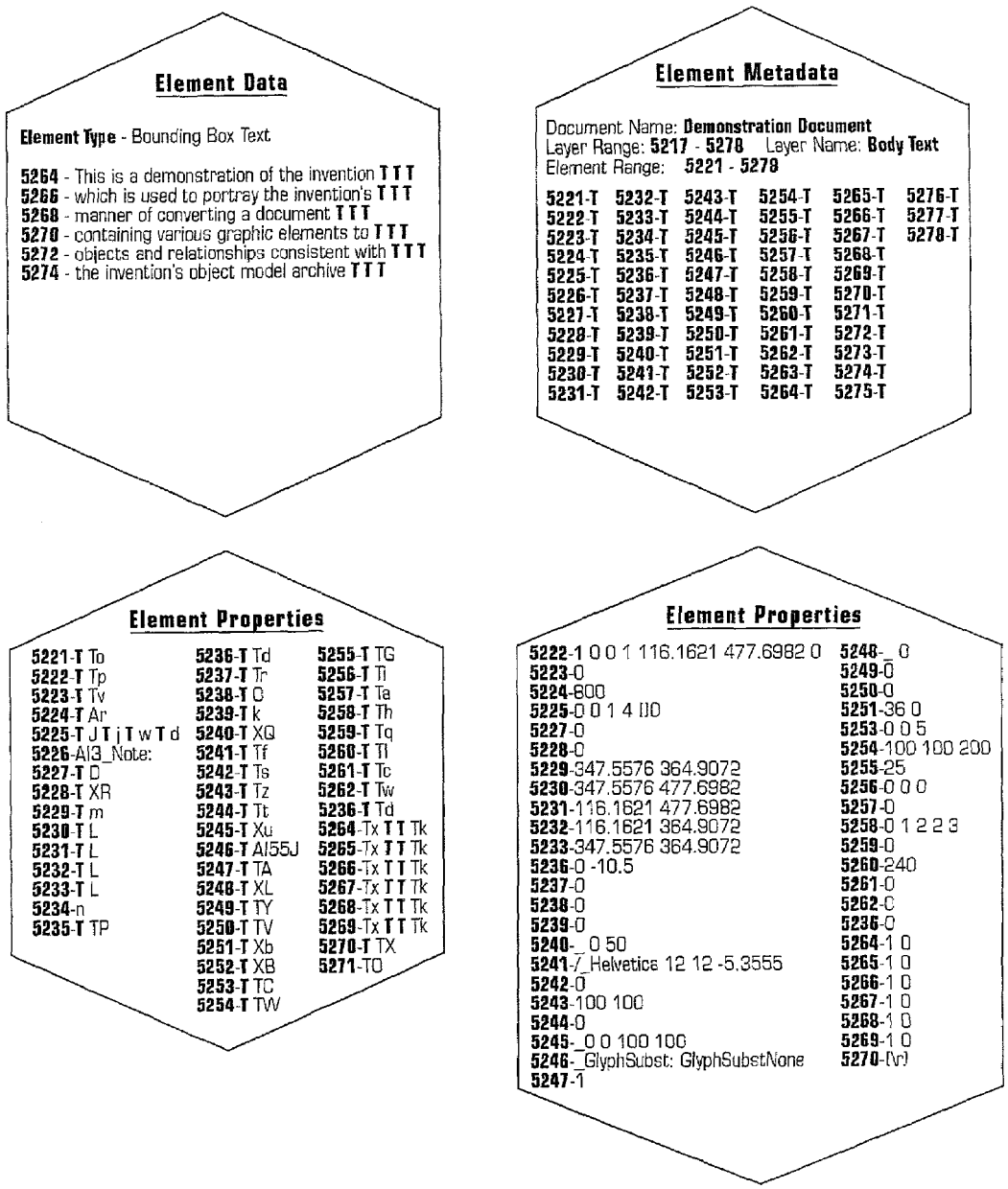

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method of archiving an item comprising in a computer processing system:
   presenting the item to a parser;
   parsing the item into a plurality of multi-part object structures wherein portions of the structures have searchable information tags associated therewith;
   evaluating the object structures in accordance with object structures previously stored in an archive;
   presenting an evaluated object structure for manual reconciliation at least where there is a predetermined variance between the object and at least one of a predetermined standard and a user defined rule.

2. The method as in claim 1 wherein the respective structure can be manually edited after being presented for reconciliation.

3. The method as in claim 1 which includes, before the parsing step, converting an input item to a standardized format for input to the parser.

4. The method as in claim 1 which includes storing a reconciled object structure in the archive without substantial redundancy.

5. The method as in claim 4 which includes selectively editing an object structure, linked to other structures to thereby effect a one-to-many change in a plurality of archived items.

6. The method as in clam 5 which includes compiling an item to be output from the archive, wherein at least one object-type structure of the item has been edited during the one-to-many change and wherein the compiled item includes a plurality of linked object-type structures converted into a predetermined output file formal.

7. The method as in claim 6 which includes compiling a plurality of items wherein the at least one object-type structure had been linked in the archive to members of the plurality.

8. The method as in claim 7 wherein the plurality of items comprises a plurality of color separations and including producing the color separations sequentially wherein at least some of the separations contain a common graphical symbol edited commonly in the archive by editing the respective common respective object structure.

9. The method as in claim 1 which includes forming object oriented data structures from the parsed items wherein the data structures include at least some of item properties, item property values, element properties and element property values.

10. An object, oriented archival system comprising:
    a storage medium, and a set of executable instructions for establishing an archive of documents represented by linked object oriented elements stored in the medium, wherein the archive exhibits minimal redundancy with at least some elements linked to pluralities of the elements and wherein some of the instructions, in response to a selected editing command, alter at least one element common to and linked to a selected plurality of other elements to thereby effect a one-to-many editing process and additional instructions for compiling an output file, in a selected format.

11. The system as in claim 10 which includes instructions for producing a plurality of files corresponding to color separations for printing a multi-color item.

12. The system as in claim 10 which includes instructions for storing object oriented elements incorporating property elements and associated values.

13. The system as in claim 12 which includes additional instructions for storing document properties and property values.

14. The system as in claim 13 wherein the executable instructions link selected property elements with selected document properties and values.

15. The system as in claim 10 wherein archived object oriented elements comprise a data structure which incorporates document properties and associated values.

16. The system as in claim 15 wherein document properties carry a linking tag.

17. The system as in claim 10 wherein executable instructions compare incoming object oriented elements to archived elements to thereby minimize redundancy in the archive.

18. The system as in claim 10 wherein a document can be represented by a plurality of linked object-type data structures which include document properties; document property values, element properties and element property values.

19. The system as in claim 10 wherein the output file comprises at least one of an input for a printer, an input for a printing press, and an input for an electronic network.

20. The method as in claim 1 for generating layers corresponding to color separations for a printing process further comprising:
    establishing the archive populated with a plurality of graphically oriented object-type structures wherein a first plurality of the structures represents a first layer, corresponding to a color separation for a multi-color output document, wherein the members of the first plurality are linked to establish element definitions and locations, relative to one another, in the first layer, and, at least a second plurality of the structures wherein the second plurality represents a second layer corresponding to a second color separation for the output document wherein the members of the second plurality are linked to establish element definitions and locations, relative to one another, in the second layer, and, wherein the establishing step includes, analyzing the members of the first and second pluralities for common structures, and storing a representation of only one structure in the event that multiple common structures are detected.

21. The method as in claim 20 which includes converting at least one new document to a predetermined input format, and parsing the document to a third plurality of object oriented-type structures.

22. The method as in claim 21 which includes evaluating the members of the third plurality in accordance with at least one of a predetermined rule and a predetermined standard.

23. The method as in claim 22 which includes producing at least one of a report and a visual display of the results of the evaluating step.

24. The method as in claim 23 which includes editing the visual display thereby altering at least one of the members of the third plurality.

25. The method as in claim 21 which includes comparing the object structures to the pre-stored contents of a selected archive and adding only non-redundant object structures to the archive and establishing at least one added link to a pre-stored object structure in the event of a detected redundancy wherein the contents of the archive are substantially non-redundant.

26. The method as in claim 21 which includes compiling at least one output document into a predetermined output formal from a plurality of archived object structures.

27. The method as in claim 20 which includes editing a plurality of layers, substantially simultaneously, by altering a single object structure, common to all of the layers.

28. The method as in claim 25 which includes editing a plurality of documents, substantially simultaneously, by altering a single object structure common to all of the documents.

* * * * *

UNITED STATES PATENT AND TRADEMARK OFFICE
CERTIFICATE OF CORRECTION

| | |
|---|---|
| PATENT NO. | : 7,447,713 B1 |
| APPLICATION NO. | : 09/977502 |
| DATED | : November 4, 2008 |
| INVENTOR(S) | : Steven E. Berkheimer |

It is certified that error appears in the above-identified patent and that said Letters Patent is hereby corrected as shown below:

At Column 47, lines 9 and 10 of Claim 1 change "1. A method of archiving an item comprising in a computer processing system:" to --1. A method of archiving an item in a computer processing system comprising:--.

Signed and Sealed this
Twenty-fifth Day of December, 2012

David J. Kappos
*Director of the United States Patent and Trademark Office*